United States Patent [19]
Fletcher et al.

[11] Patent Number: 5,862,483
[45] Date of Patent: *Jan. 19, 1999

[54] MOBILITY MANAGEMENT METHOD FOR DELIVERING CALLS IN A MICROCELLULAR NETWORK

[75] Inventors: Anthony G. Fletcher; John L. Hatcher, both of Corinth, Miss.

[73] Assignee: DSC/Celcore Inc., Plano, Tex.

[ * ] Notice: The term of this patent shall not extend beyond the expiration date of Pat. No. 5,521,961.

[21] Appl. No.: 653,569

[22] Filed: May 24, 1996

Related U.S. Application Data

[63] Continuation of Ser. No. 201,971, Feb. 25, 1994, Pat. No. 5,521,961, which is a continuation-in-part of Ser. No. 37,170, Mar. 26, 1993, Pat. No. 5,487,101.

[51] Int. Cl.⁶ ...................................................... H04Q 7/38
[52] U.S. Cl. ........................... 455/435; 455/453; 455/444
[58] Field of Search ..................................... 455/435, 453, 455/443, 444, 448

[56] References Cited

U.S. PATENT DOCUMENTS

| | | | |
|---|---|---|---|
| 4,144,409 | 3/1979 | Utano et al. | 455/411 |
| 4,144,411 | 3/1979 | Frenkiel | 455/447 |
| 4,144,412 | 3/1979 | Ito et al. | 455/450 |
| 4,144,496 | 3/1979 | Cunningham et al. | 455/447 |
| 4,156,873 | 5/1979 | Moore | 342/187 |
| 4,485,486 | 11/1984 | Webb et al. | 455/450 |
| 4,658,096 | 4/1987 | West, Jr. et al. | 455/74.1 |
| 4,704,734 | 11/1987 | Menich et al. | 455/462 |
| 4,727,590 | 2/1988 | Kawano et al. | 455/446 |
| 4,737,978 | 4/1988 | Burke et al. | 455/435 |
| 4,748,682 | 5/1988 | Fukae et al. | 455/137 |
| 4,759,051 | 7/1988 | Han | 455/437 |
| 4,771,448 | 9/1988 | Koohgoli et al. | 455/450 |
| 4,775,998 | 10/1988 | Felix et al. | 455/450 |
| 4,775,999 | 10/1988 | Williams | 455/435 |
| 4,790,000 | 12/1988 | Kinoshita | 455/449 |
| 4,794,635 | 12/1988 | Hess | 455/513 |
| 4,797,947 | 1/1989 | Labedz | 455/422 |
| 4,799,253 | 1/1989 | Stern et al. | 455/448 |
| 4,850,037 | 7/1989 | Bochmann | 455/276.1 |
| 4,881,082 | 11/1989 | Graziano | 342/432 |
| 4,893,327 | 1/1990 | Stern et al. | 455/453 |
| 4,901,340 | 2/1990 | Parker et al. | 455/432 |
| 4,939,791 | 7/1990 | Bochmann et al. | 455/276.1 |
| 4,999,835 | 3/1991 | Lagoutte | 370/389 |
| 5,067,147 | 11/1991 | Lee | 455/436 |
| 5,067,173 | 11/1991 | Gordon et al. | 359/152 |
| 5,095,529 | 3/1992 | Comroe et al. | 455/16 |
| 5,179,720 | 1/1993 | Grube et al. | 455/16 |
| 5,208,847 | 5/1993 | Allen | 455/448 |
| 5,235,632 | 8/1993 | Raith | 455/449 |
| 5,251,249 | 10/1993 | Allen et al. | 455/448 |
| 5,278,991 | 1/1994 | Ramsdale et al. | 455/444 |
| 5,293,641 | 3/1994 | Kallin et al. | 455/453 |
| 5,345,499 | 9/1994 | Benveniste | 455/449 |
| 5,357,559 | 10/1994 | Kallin et al. | 455/449 |
| 5,394,158 | 2/1995 | Chia | 342/457 |
| 5,396,645 | 3/1995 | Huff | 455/441 |
| 5,521,961 | 5/1996 | Fletcher et al. | 455/435 |
| 5,574,973 | 11/1996 | Borth et al. | 455/435 |

FOREIGN PATENT DOCUMENTS

| | | |
|---|---|---|
| 0 391 597 | 10/1990 | European Pat. Off. |
| 2 234 649 | 2/1991 | United Kingdom . |
| 92/02104 | 2/1991 | WIPO . |
| 91/07019 | 5/1991 | WIPO . |
| 91/19403 | 12/1991 | WIPO . |

*Primary Examiner*—Dwayne D. Bost
*Assistant Examiner*—Myron K. Wyche
*Attorney, Agent, or Firm*—Kenyon & Kenyon

[57] ABSTRACT

In a method of providing cellular telephone service to a mobile telephone located in an off-load cellular telephone system adjacent to a main cellular telephone system, the mobile telephone is registered with the off-load cellular telephone system upon the mobile telephone entering the off-load cellular telephone system, and then is registered with the main cellular telephone system as being located in the off-load cellular telephone system as a function of predetermined criteria. During the time in which the mobile telephone has entered the off-load cellular telephone system but has not yet registered with the main cellular telephone system as being located in the off-load cellular telephone system, rebroadcasting page signals from main cellular telephone system into the off-load cellular telephone system ensures delivery of incoming telephone calls to the mobile telephone.

20 Claims, 9 Drawing Sheets

MOBILITY MANAGEMENT METHOD FOR DELIVERING CALLS IN A MICROCELLULAR NETWORK

CROSS-REFERENCE TO RELATED APPLICATION

This application is a continuation of application Ser. No. 08/201,971, filed on Feb. 25, 1994 now U.S. Pat. No. 5,521,967, which is a continuation in part of Ser. No. 08/037,170, filed on Mar. 26, 1993, which is now U.S. Pat. No. 5,487,101 issued Jan. 23, 1996.

BACKGROUND OF THE INVENTION

1. Field Of The Invention

The present invention relates generally to a cellular communication system used to off-load telephone calls from a main cellular telephone system to an off-load cellular telephone system, and, more particularly, to a method of ensuring incoming call delivery to a mobile telephone located in the off-load cellular system.

2. Description Of The Related Art

Cellular mobile telephones (mobile telephones) are typically employed in automobiles, ships or the like, and thus are transportable with the user into various different geographic zones. In each of the different geographic zones, one or more mobile telephone switching offices (MTSO) are provided to complete call connections. Once connected to the MTSO, the mobile telephone may then be connected to another mobile telephone within a specific zone or, through land-based networks such as a public switching telephone network (PSTN) to a land-based telephone or to another cellular mobile telephone in a different zone.

Cellular mobile telephone systems (cellular systems) service specific geographic areas, or zones, each of which is typically divided into a plurality of cells. Each cell includes a stationary transmitter/receiver (transceiver) station coupled to transmit and receive antennas. The transceiver station broadcasts signals within its signal coverage area and provides radio communication connections with mobile telephones physically located within the associated cell. The stationary transceiver stations, in turn, are connected to a MTSO associated with the zone where the transceiver stations are located. The MTSO is generally a computer-based system and provides call processing and switching functions, between and among cells. Typical cellular systems use cells known as macrocells, which provide signal coverage over fairly large geographic areas, often from a radius of one mile to several miles.

Each cell within a specific zone of a cellular system has a number of frequencies assigned to it to establish radio communications with a mobile telephone. The frequencies are divided into control channels, paging channels and voice channels. The paging and control channels are used for the mutual identification between the mobile telephone and the cellular system providing the cellular mobile telephone service. The location or frequency of the control channels contained in the frequency range assigned to each cell identifies the type of cellular system which is being used. Typically, one set or range of frequencies is called an "A" cellular system and a second set of frequencies is called a "B" cellular system. Generally, a specific geographic area contains one of each type of cellular system (i.e., an A and a B cellular system), thereby providing alternative cellular service to that area.

A mobile telephone must identify itself to the cellular system provider before service for the mobile telephone can be established. The communications between a mobile telephone and its respective transceiver station must conform with the industry standard for such communications, set forth in the Mobile Station—Land Station Compatibility Specification EIA/TIA 553 (EIA/TIA 553). The identification process begins using the control channels. When a mobile telephone is first switched on, the mobile telephone scans through the forward control channels and measures the signal strength of each forward control channel. It will then tune to the strongest forward control channel and lock on to the forward control channel message stream. The forward control channel message stream is a continuous flow of data from the transceiver station to the mobile telephone and contains, for example, set-up parameters, global commands and registration identification information. The origination point of the forward control channel message stream is generally the MTSO. When the mobile telephone makes an access attempt, the mobile telephone must access a reverse control channel. A reverse control channel access message is generated by the mobile telephone and broadcasted over the reverse control channel. The reverse control channel access message contains various data which permits the cellular system to identify the mobile telephone and thereby determine whether the mobile telephone should be provided with cellular service.

In accordance with EIA/TIA 553, the mobile telephone will continuously scan for and lock onto the strongest available control channel. In addition, EIA/TIA 553 requires that a mobile telephone rescan the control channels at the end of a power-up process, tuning to the strongest control channel available. EIA/TIA 553 also requires rescanning for the strongest control channel after a mobile telephone accesses a reverse control channel and after an Autonomous Registration by a mobile telephone with its respective transceiver station. Autonomous Registration is a process used to track the location of a mobile telephone within a cellular system in which a mobile telephone periodically identifies itself to an associated transceiver station as being active in the system at the time the Autonomous Registration message is sent. EIA/TIA 553 does not require that a cellular system provide for Autonomous Registration of mobile telephones, but does specify the procedure for Autonomous Registration if it is used.

In a cellular system which implements Autonomous Registration in compliance with EIA/TIA 553, the Autonomous Registration generally works as follows. Included in the forward control channel message stream broadcasted by the transceiver station of each cell in a cellular system is a registration field. Periodically included in the message stream is a REGID value. Optionally included in the message stream as a Global Action Overhead Message is a REGINCR value. The REGID value is received by the mobile telephone and stored in a designated location where it can then be monitored by the mobile telephone. For example, when a mobile telephone is first powered on, the mobile telephone locks onto the forward control channel message stream of the selected control channel and then receives and stores a REGID value.

As the REGID value is periodically broadcasted, it is also incremented. The mobile telephone continues to receive the incremented REGID values and compares the current REGID value against the stored REGID value. When the differential between the current and stored REGID values, determined according to a predetermined algorithm, equals or exceeds the REGINCR value being broadcast to the mobile telephone, an Autonomous Registration is initiated by the mobile telephone. The REGID value at the time the Autonomous Registration is initiated is saved as the new stored REGID value. Before Autonomous Registration is completed, the mobile telephone performs a System Access Attempt in accordance with EIA/TIA 553. The first step in the System Access Attempt is a rescan for the strongest available forward control channel. Once the mobile telephone locks onto and seizes the strongest control channel, it completes Autonomous Registration.

In typical macrocellular systems, incoming calls are handled in the following manner. When a caller dials the number of a mobile telephone, the incoming call is routed to the MTSO of the macrocellular network which is the home network of the mobile telephone. The MTSO receives the incoming call and then attempts to locate the desired mobile telephone. The MTSO locates the mobile telephone via a Home Location Register (HLR). The HLR, which may be part of the MTSO or a separate device, maintains a list of the mobile telephones which are subscribers of the macrocellular system. The HLR also maintains a list of the current registration of the mobile telephone. The HLR may be, for example, a microprocessor based device. The registration of the mobile telephone generally will be one of two states: home registered; or IS-41 registered.

Home registered means that the mobile telephone is registered as being located within the macrocellular network. IS-41 registered means that the mobile telephone is registered with another cellular system in accordance with the industry standard EIA/TIA IS-41 Cellular Radiotelecommunications Intersystem Operations specification (EIA/TIA IS-41). EIA/TIA IS-41 provides an industry standard interface for communication between two separate macrocellular systems. For example, every cellular system is assigned a unique system identification number (SID) by the Federal Communications Commission (FCC). The SID is regularly broadcasted by the cells of a given cellular system. If a mobile telephone transitions between two cellular systems having different SIDs, the mobile telephone will detect the change of SID and initiate an Autonomous Registration in the new cellular system if the cellular system is configured for Autonomous Registration. The Autonomous Registration, in turn, will generally cause an IS-41 registration of the mobile telephone, thereby enabling the mobile telephone's home cellular system to continue delivering incoming calls via the IS-41 interface. If Autonomous Registration is not enabled in the cellular system, there will generally be no IS-41 registration even if the mobile telephone detects a change in SIDs. The transition of mobile telephone between two macrocells of the same cellular system will not create a change of SIDs and, thus, there would be no IS-41 registration in this circumstance. IS-41 registered is commonly referred to as "network registered."

If a mobile telephone is home registered, the MTSO will receive a message from the HLR indicating home registration. As a result, the MTSO will send a page signal to the macrocells associated with the MTSO and the macrocells will broadcast the page signal to notify the intended mobile telephone of the incoming call. If the intended mobile telephone receives the page signal, it will send a page response signal in response. The macrocellular system will then set up the incoming call.

If a mobile telephone is IS-41 registered, the MTSO will receive a routing number for the location of the mobile telephone as a result of EIA/TIA IS-41 procedures. This may be the case, for example, when a mobile telephone transitions between cellular systems having different SIDs. In this situation, the MTSO will not broadcast a page signal for the incoming call. The MTSO will, however, deliver the incoming call directly to the mobile telephone via a standard PSTN connection. The routing number is delivered to the HLR from a Visitor Location Register (VLR) associated with the cellular network where the mobile telephone is currently located. The VLR is similar to the HLR except that the VLR has no home customers and only registers mobile telephones that are currently within the cellular network associated with the VLR. The VLR may be, for example, a microprocessor based device and is generally connected to the HLR via an EIA/TIA IS-41 connection.

Outgoing calls from a mobile telephone, whether home registered or IS-41 registered, are handled in accordance with the specifications of EIA/TIA 553 by the cellular system where the mobile telephone is currently located.

In a typical cellular system, as a mobile telephone travels along a path that passes from one cell to another, a handoff occurs if the mobile telephone is active, i.e., the mobile telephone is attempting a telephone call or handling an existing call. The handoff action is controlled by the MTSO which monitors the signal strength received from the mobile telephone. The handoff command is typically generated when the signal received by the mobile telephone falls below a preselected signal strength, thus indicating that the mobile telephone is at the cell boundary of one cell and requires a transfer of the cellular service to an adjacent cell which is able to receive a signal from the mobile above the preselected signal strength.

As a mobile telephone passes from one cell to another cell, the handoff command instructs the new cell which the mobile telephone is entering to begin transmitting at a frequency which is different from the frequency which was transmitted by the cell from which the mobile telephone is exiting. This procedure is followed as the mobile telephone passes into each next successive, adjacent cell. The assigned frequencies of each adjacent cell are different, and such assigned frequencies are not repeated except for cells that are far enough away from each other so that no interference problems will occur.

The commercial success of cellular service has forced cellular carriers to substantially increase the capacity of cellular systems. Accordingly, cellular system providers desire to expand their systems to serve an increasing number of customers within a particular geographic location. Various solutions have been proposed to increase the capacity of cellular systems and thereby address the foregoing need. For example, a typical macrocell may be split into four smaller cells, each with a radius of half the radius of the original macrocell, thereby permitting cellular service to be increased four fold.

Another approach to increasing the capacity of cellular systems is to add additional cell sites to the cellular system to provide additional cellular service in small geographic areas having heavy cellular subscriber usage. These smaller cell sites are typically known as microcell sites. Microcells operate functionally similar to a traditional macrocellular or main cellular system, but only provide cellular service for a small geographic area. The microcell sites are typically directly connected to the macrocellular system using coaxial transmission lines, microwave links or an optical fiber cable network, via a nonstandard protocol which is proprietary to the manufacturer of the macrocellular equipment. Microcells, in general, improve frequency reuse by concentrating frequency channels in the area of greatest subscriber demand and allowing frequency reuse within a particular geographic area.

While cells may be subdivided into smaller cells to provide cellular service for an increasing number of customers, shrinking cell sites create additional considerations and problems. For example, the rate at which mobile telephones move through the cell and the non-uniformity of the electromagnetic field generated in the cell affect the performance of a microcell system. Both factors relate to the time required to determine the relative location of the mobile telephone and to process a handoff of the mobile telephone from the transceiver station of one microcell where the mobile telephone is currently located but is preparing to exit, to the transceiver station of another microcell where the mobile telephone is entering. Naturally, the smaller the cell, the greater the number of handoffs that are required as a mobile telephone moves through the cellular system. If a handoff is required, one or more candidate microcells must be queried for their idle channel status and for a verification of the mobile telephone's signal strength in that candidate microcell. The processing of the decision, status, and verification usually requires the intervention of higher level system control functions in addition to the control function in the serving and candidate microcells. In addition, the mobile telephone must be instructed to tune to a frequency available in the candidate microcell and verification of its presence after the handoff must be made by the candidate cell. Thus, the increased number of handoffs within a microcell system requires a significant amount of time for handoff processing.

In addition, since microcellular systems are usually directly connected to the macrocellular system via a nonstandard proprietary protocol, it is impossible to integrate or include a generic microcell system to off-load cellular service from the macrocellular systems. Generally, the microcellular equipment must be from the manufacturer of the macrocellular equipment for a particular cellular system. The difficulty of competing products to provide cellular service results in microcellular systems being expensive, difficult to integrate with other cellular systems and presents problems with incoming call delivery to a mobile telephone located in the microcellular system.

In a typical macrocellular system which employs a microcellular system to off-load cellular subscribers in an area of heavy subscriber usage, missed incoming calls are a problem. In particular, if a cellular system provider integrates a current microcellular system into an existing macrocellular system and uses microcellular equipment that was not manufactured by the macrocellular equipment manufacturer, then incoming calls may be missed. The missed calls result when a mobile telephone transitions from the macrocellular system to the microcellular system. When the mobile telephone enters the microcellular system, it automatically locks onto a frequency of the microcell in accordance with EIA/TIA 553 because the microcellular control channel is the strongest signal available to the mobile telephone at that time. As a microcellular system is designed to off-load traffic from the macrocellular system, the microcellular system must broadcast the same SID as the macrocellular system. Thus, because the mobile telephone detects no change in SIDs, there is no registration of the mobile telephone with the macrocellular system as being in the microcellular system upon the transition into the microcellular system. Accordingly, the location of the mobile telephone will be unknown to the macrocellular system while the mobile telephone remains in the microcellular system.

As a result, on an incoming telephone call, the macrocellular system HLR will still have the mobile telephone listed as being home registered and a page signal will be broadcast on macrocellular frequencies while the mobile telephone is locked onto a microcellular frequency. Consequently, the mobile telephone located in the microcellular network and locked onto a microcellular frequency will miss the page signal and the incoming telephone call.

In current microcellular systems having equipment manufactured by the manufacturer of the macrocellular equipment and being directly connected to the macrocellular system, such as by coaxial transmission lines, microwave links or an optical fiber cable network, via a matched nonstandard proprietary interface, incoming calls may not be missed. In this circumstance, the new microcells are essentially additional macrocells. A mobile telephone located within this type of microcellular network will be tracked by the HLR as being home registered and the MTSO will broadcast a page signal for incoming calls. The page signal will be sent to both the macrocells and the microcells because the microcells are directly connected to the macrocellular system. If the intended mobile telephone provides a page response signal, the incoming call will be set up. In this situation, however, the cellular system provider is constrained to purchase microcellular equipment from the manufacturer of the macrocellular equipment due to the nonstandard proprietary interface between the equipments, thus making the microcellular equipment expensive.

Thus, current microcellular systems which are integrated into existing macrocellular systems must have the same manufacturer as the existing macrocellular equipment to implement the nonstandard proprietary interface between the macrocellular and microcellular equipment and ensure incoming call delivery. Such microcellular systems, however, are unduly expensive. If microcellular equipment not manufactured by the maker of the macrocellular equipment is used, then incoming calls may be missed if a mobile telephone is located in the microcellular system.

Thus, it is desirable to provide for easy and inexpensive off-load cellular service for a macrocellular system by establishing an off-load microcellular system in a small area which requires a high concentration of cellular service. For example, a large office building or shopping mall may require a significant amount of cellular service which could be easily provided using a microcellular system since mobile telephone users typically establish cellular service while walking from office to office in a building or from store to store in a shopping mall. Thus, mobile telephones in these small areas are less likely to rapidly move across large geographic areas, making use of a microcellular system ideal.

In addition, there is currently no method of off-loading cellular service from a macrocellular system to another macrocellular system or to an off-load microcellular system without reconfiguring the macrocellular system to ignore the cellular service in the microcellular system which is providing cellular service in the same area where the macrocellular system had previously provided the cellular service. It is, therefore, desirable to provide this additional or off-load microcellular service for customers in a high concentration area of a macrocellular system without reconfiguring the main cellular system, thereby providing off-load microcellular service which is transparent to the main cellular system.

It is also desirable to provide off-load cellular service for customers in a high concentration area served by a main cellular system by replacing the macrocellular system in the high concentration area with off-load microcellular service without reconfiguring the macrocellular system, thereby providing off-load microcellular service which is transparent to the macrocellular system.

Further, it is desirable to off-load cellular service from a main cellular system using, for example, an off-load microcellular system to provide cellular service in an area of high concentration, without requiring all traffic in the microcellular system to interface with the MTSO. The reason that it is undesirable for the off-load microcellular system to always be required to interface with the MTSO is to reduce the processing burden of the MTSO and because no standard interface has been developed which allows the off-load microcellular system to be easily integrated with the MTSO without the off-load microcellular system being required to implement the specific interface requirements of the MTSO.

It is also desirable to support industry standard methods for mobile telephone registration and incoming call processing between the macrocellular system and the off-load microcellular system. Since various vendors provide MTSOs for cellular service using different interface protocols, an off-load microcellular system that did not support industry standards would be required to know the interface protocol used by each cellular system. Such an off-load microcellular system would be complex and not easily integratable into an already existing cellular system.

Finally, it is desirable that a mobile telephone which is being serviced by the off-load microcellular system be able to establish telephone service with telephone equipment which is located outside the microcellular system. Thus, even though the off-load microcellular system is transparent to the main cellular system, the off-load microcellular system must still be able to provide telephone service with telephone equipment located outside the serving area of the off-load cellular system, such as a PSTN.

SUMMARY OF THE INVENTION

It is, therefore, an object of the present invention to provide an off-load cellular system within an existing macrocellular system for off-loading calls in areas of high cellular subscriber demand from the macrocellular system while operating transparently to the macrocellular system.

It is another object of the present invention to provide an off-load cellular system which permits a mobile telephone located within the off-load cellular system to establish telephone connection with telephone equipment located outside of the off-load cellular system.

It is another object of the present invention to provide an off-load cellular system which is not required to interface with the MTSO of a macrocellular system, thereby eliminating the use of a nonstandard protocol interface between the macrocellular and microcellular systems.

It is still another object of the present invention to provide an off-load cellular system which utilizes industry standards for mobile telephone registration and call processing so that the off-load cellular system can be easily integrated into any macrocellular system.

These and other objects of the present invention are realized by using a combination of nearby forward control channel monitoring, rebroadcasting of monitored page signals from the macrocellular system, selected shedding of mobile telephone access attempts via a directed retry to the macrocellular system, and call delivery utilizing a standard communications interface system to provide an off-load cellular system which can operate within an existing macrocellular system transparently and without requiring nonstandard protocol interfacing with different macrocellular MTSOs. The present invention allows the use of a standard mobile telephone in the off-load cellular system as well. Thus, no new equipment is needed by the mobile telephone user.

The off-load cellular system according to the present invention may be a stand alone custom application used in office buildings, hospitals, shopping malls, etc., or the off-load cellular system may be a cellular system which provides selective service to customers of a macrocellular system to off-load cellular service which has been previously provided by the macrocellular system. The present invention also provides the intersystem functions of customer verification, call delivery and handoff using either existing cellular clearing house services, the EIA/TIA IS-41 interface specifications, or a combination of the two.

The microcellular network according to the present invention allows a macrocellular system to treat the microcellular system as functionally being a separate cellular system, thereby permitting the use of a standard intersystem interface, such as the EIA/TIA 41 standard for intersystem operations, despite the microcellular system being integrated into the macrocellular system. Moreover, flexible registration criterion are used to limit a mobile telephone's ability to register with the macrocellular system as being located in the off-load microcellular system when the mobile telephone is considered an unsuitable user for the off-load microcellular service.

The microcellular system according to the present invention reduces the number of handoffs required in a microcellular system by delaying registration of a mobile telephone with the macrocellular system as being located in the microcellular system. Until a mobile telephone becomes so registered, it remains home registered with the macrocellular system and thus will only be handed off after traversing relatively large macrocells. Once the mobile telephone becomes registered with the macrocellular system as being located in the microcellular system, the mobile telephone will be handed off between microcells as it moves through the microcellular system, thereby necessitating significantly more hand offs than in the macrocellular system due to the small radii of microcells. Therefore, the delay in registration of the mobile telephone with the macrocellular system as being located in the microcellular system minimizes the number of hand offs required to be performed while the mobile telephone is in the microcellular system.

The present invention ensures the receipt of incoming calls to a mobile telephone located in a microcellular system by rebroadcasting page signals from the macrocellular system. Page rebroadcasting delivers page signals to a mobile telephone located in a microcellular system during the period of time in which the mobile telephone has left the macrocellular system but has not yet registered with the macrocellular system as being located in the microcellular system. Once a mobile telephone has registered with the macrocellular system as being located in the microcellular system, incoming calls are delivered directly to the mobile telephone through a standard communications interface system, such as EIA/TIA IS-41.

In one preferred embodiment of the present invention, a replacement scenario, a macrocell of a macrocellular system is replaced by a microcellular system comprising at least one border microcell and at least one interior microcell. The microcellular system is constructed so that the border microcell is substantially within the signal coverage area of at least one adjoining macrocell and the interior microcell is substantially beyond the signal coverage area of any adjoining macrocell. The border and interior microcells include programmable parameters for Autonomous Registration, IS-41 criterion and Page Rebroadcasting.

When a mobile telephone transitions from the macrocell to the border microcell, an offset signal broadcast by the border microcell preferably causes the mobile telephone to initiate an Autonomous Registration with the border microcell. The Autonomous Registration in turn preferably causes the mobile telephone to become IS-41 qualified but preferably not IS-41 registered. If the mobile telephone attempts a telephone call while in the border microcell, the mobile telephone will preferably be IS-41 registered during the attempt and may be IS-41 deregistered upon call completion. Alternatively, the border microcell may be set to IS-41 register the mobile telephone after a predetermined number of Autonomous Registrations. Any page signals from the macrocellular system will be rebroadcasted into the border microcell. Thus, in the event of an incoming call, the mobile telephone will receive the rebroadcasted page signal and then will be shed to the macrocellular system via a Directed Retry message in accordance with EIA/TIA 553.

When the mobile telephone transitions from the border microcell to an interior microcell, another offset signal, two times the border microcell offset, is broadcast by the interior microcell and preferably causes the mobile telephone to initiate an Autonomous Registration with the interior microcell. As a result of the Autonomous Registration, the interior microcell IS-41 criterion parameters preferably cause the mobile telephone to become IS-41 registered. The mobile telephone will preferably be IS-41 deregistered if there are a predetermined number of missed Autonomous Registrations. There is no page rebroadcasting in an interior microcell as the mobile telephone is generally out of signal coverage range of an adjoining macrocell. In the event of an incoming call, the call is preferably delivered directly to the mobile telephone via standard IS-41 procedures as a result of the automatic IS-41 registration.

When the mobile telephone returns to the border microcell, the mobile telephone is preferably IS-41 deregistered on the first Autonomous Registration, which is forced upon entry into the border microcell due the double offset of the interior microcell mismatching the single offset of the border microcell. Thus, the macrocellular system begins to page on incoming calls for the mobile telephone and page rebroadcasting into the border microcell is enabled.

When the mobile telephone transitions back to the macrocell, the offset inserted by the border microcell mismatches the macrocell registration information and preferably causes Autonomous Registration of the mobile telephone with the macrocellular system. Incoming calls are now handled in accordance with known cellular procedures.

Thus, it can be seen that the present invention ensures the delivery of incoming calls to a mobile telephone located in a microcellular network which replaces part of a macrocellular network and minimizes unnecessary IS-41 registrations by managing Autonomous Registrations when transitioning through a cellular system, rebroadcasting page signals while in a border microcell, and delaying IS-41 registration until the mobile telephone has reached an interior microcell.

In another preferred embodiment of the present invention, an underlay scenario, a macrocell of a macrocellular system is underlaid by a microcellular network comprising at least one underlay microcell. The microcellular network is constructed so that the underlay microcell is within the signal coverage area of at least one adjoining macrocell. The underlay microcell includes programmable parameters for Autonomous Registration, IS-41 criterion and Page Rebroadcasting.

Upon the transition of a mobile telephone from the macrocellular system to an underlay microcell, an offset signal broadcast by the underlay microcell preferably causes the mobile telephone to initiate an Autonomous Registration with the underlay microcell. The Autonomous Registration in turn causes the mobile telephone to become IS-41 qualified but preferably not IS-41 registered. If the mobile telephone attempts a call while in the underlay microcell, the mobile telephone will be IS-41 registered during the attempt and IS-41 deregistered upon call completion. Alternatively, the underlay microcell may be set to IS-41 register the mobile telephone after a predetermined number of Autonomous Registrations. Any page signals from the macrocellular system will be rebroadcasted into the underlay microcell. In the event of an incoming call, the mobile telephone will be shed to the macrocellular system via a directed retry message in accordance with EIA/TIA 553.

When the mobile telephone transitions back to the macrocell, the offset signal from the underlay microcell mismatches the macrocell registration information and preferably causes Autonomous Registration of the mobile telephone with the macrocellular system. Incoming calls are now handled in accordance with known cellular procedures.

Thus, it can be seen that the present invention ensures the delivery of incoming calls to a mobile telephone located in a microcellular system which underlays part of a macrocellular system and minimizes unnecessary IS-41 registrations by managing Autonomous Registrations when transitioning through the cellular system, rebroadcasting page signals while in an underlay microcell, and delaying IS-41 registration.

In yet another embodiment, a partial underlay scenario, a macrocell of a macrocellular system is underlaid by a microcellular network comprising at least one partial underlay microcell. The microcellular network is constructed so that the partial underlay microcell is partially within the signal coverage area of at least one adjoining macrocell and partially beyond the signal coverage area of that macrocell. The partial underlay microcell includes programmable parameters for Autonomous Registration, IS-41 criterion, and Page Rebroadcasting.

Upon the transition of a mobile telephone from the macrocellular system to a partial underlay microcell, an offset signal broadcast by the partial underlay microcell preferably causes the mobile telephone to initiate an Autonomous Registration procedure with the partial underlay microcell. The Autonomous Registration in turn preferably causes the mobile telephone to become IS-41 qualified but preferably not IS-41 registered. If the mobile telephone attempts a call while in the border microcell, the mobile telephone will preferably become IS-41 registered upon the first call attempt. The mobile telephone can also become IS-41 registered after a predetermined number of Autonomous Registration attempts. Any page signals from the macrocellular system will be rebroadcasted into the partial underlay microcell until the mobile telephone becomes IS-41 registered. In the event of an incoming call, the mobile telephone will preferably be shed to the macrocellular system via a directed retry message in accordance with EIA/TIA 553, provided that the mobile telephone has not been IS-41 registered. If the mobile telephone is IS-41 registered, the call will preferably be delivered via EIA/TIA IS-41 procedures.

When the mobile telephone returns to the macrocell from the partial underlay microcell and if the mobile telephone is IS-41 registered, it will preferably be IS-41 deregistered on the first Autonomous Registration and then registered as currently being located in the macrocellular system. Autonomous Registration of the mobile telephone with the macrocellular system will preferably be forced upon entry into the macrocell due the offset signal from the partial underlay microcell mismatching the macrocell registration information. Thus, the macrocellular system will now page on incoming calls for the mobile telephone and set up calls according to known cellular procedures.

Thus, it can be seen that the present invention ensures the delivery of incoming calls to a mobile telephone located in a microcellular system which partially underlays part of a macrocellular network and minimizes unnecessary IS-41 registrations by managing Autonomous Registrations when transitioning through a cellular system, rebroadcasting page signals while in a partial underlay microcell, and delaying IS-41 registration to ensure IS-41 registration of mobile telephones likely to remain in the partial underlay microcell and which are not merely passing through the microcell.

DETAILED DESCRIPTION

Figure 1:
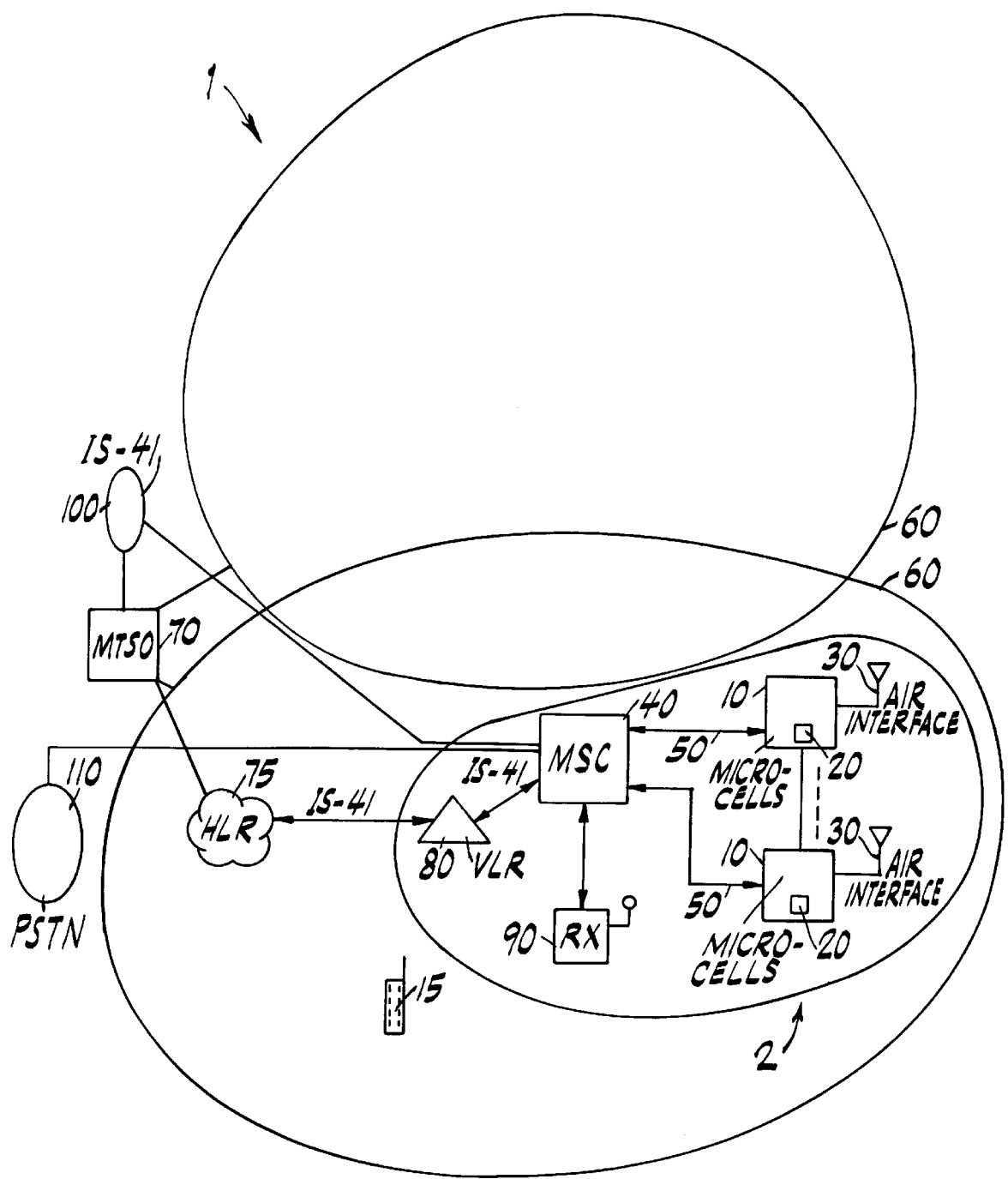
FIG. 1 is a block diagram of a cellular system according to the present invention.

FIG. 1 shows a block diagram of a cellular system according to the present invention. The cellular system has a macrocellular system 1 and a microcellular system 2, and may represent, for example, an underlay scenario in which one or more macrocells 60 of the macrocellular system 1, which broadcast signals in a signal coverage area, are underlaid by one or more microcells 10 of the microcellular system 2. Macrocell 60 is connected to a mobile telephone switching office (MTSO) 70. The MTSO 70 has an associated home location register (HLR) 75 for maintaining a database of the macrocellular system 1 subscribers. The microcells 10 are located within the signal coverage area of at least one of the macrocells 60. Microcell 10 has a transceiver 20 and transmit/receive antenna 30 for broadcasting and receiving signals within the signal coverage area of the microcell. Microcells 10 are connected to a microcellular mobile switching center (MSC) 40 via links 50. The MSC 40 may be, for example, a small footprint microprocessor based system capable of switching calls without going through the MTSO 70. The links 50 may be radio, optical, microwave or other suitable connections. A mobile telephone 15 and a page monitor unit 90 are also located within the signal coverage area of the macrocell 60.

The MTSO 70 is also connected to an IS-41 signalling network 100. The IS-41 signalling network 100 is further connected to the microcellular MSC 40. The IS-41 signalling network 100 provides an industry standard for location tracking and call routing to a mobile telephone 15. Accordingly, IS-41 signalling network 100 provides for incoming call delivery via direct routing through the IS-41 procedures to a mobile telephone 15 that is registered with the IS-41 signalling network 100 in accordance with the EIA/TIA IS-41 Cellular Radio telecommunications Intersystem Operations standard. IS-41 signalling network 100 also allows for the use of calling features, such as call-waiting or call-forwarding, when a mobile telephone 15 is registered with the IS-41 signalling network 100. A visitor location register (VLR) 80 is associated with one or more MSCs 40 of the microcellular system 2 for tracking cellular subscribers currently in the microcellular system 2. A public switched telephone network (PSTN) 110 is connected to the microcellular MSC 40 to allow a mobile telephone 15 located within a microcell 10 to place an outgoing call through a PSTN 110 without interfacing with the MTSO 70.

In FIG. 1, an incoming call may be handled as follows. An incoming call generates an incoming call indication signal in the macrocellular system 1 which is received by the MTSO 70. The MTSO 70 then obtains the current location of the mobile telephone 15 from the HLR 75. If the mobile telephone 15 is home registered with the HLR 75, the MTSO 70 sends out a page signal to at least one macrocell 60, which broadcasts the page signal throughout the signal coverage area of the at least one macrocell cell 60 using the frequencies allocated to the macrocell 60. The macrocell 60 then awaits a page response signal from a mobile telephone 15 which is responding to the original page signal. While the macrocell 60 broadcasts the page signal, the page signal is also received by a page monitor unit 90 and the page signal is rebroadcasted into the microcells 10. The page monitor unit 90 transmits the page signal to the MSC 40, which then directs that the page signal be rebroadcast on the microcellular system 2 forward control channels. The page monitor unit 90 can be implemented, for example, through the use of a macrocell page monitor device for receiving a page signal from the macrocellular system 1. If the macrocell page monitor device receives a page signal from the macrocellular system, the page monitor device may notify a controller device that a page signal has been received from the macrocellular system and retransmit the page signal to the controller device. The controller device may reformat the page signal to be accepted by the microcellular system 2 for rebroadcasting within the microcellular system, thus permitting a mobile telephone 15 to receive a page signal even while in a microcellular system 2. A more detailed example of the implementation of such a unit is disclosed in commonly owned co-pending U.S. application Ser. No. 08/037, 170, which is expressly incorporated by reference herein.

If the mobile telephone 15 is locked onto a frequency of a macrocell 60, the mobile telephone 15 will respond to the page signal broadcast by the macrocell 60 by providing a page response signal. Once the macrocell 60 receives the page response signal from the mobile telephone 15, the macrocell 60 sets up the phone call in accordance with known cellular procedures. If the mobile telephone 15 is locked onto a frequency of a microcell 10, the mobile telephone 15 will respond to the rebroadcasted page signal by providing a page response signal to the microcell 10. Once the microcell 10 receives the page response signal from the mobile telephone 15, the MSC 40 directs the transceiver 20 to broadcast a signal to the mobile telephone 15 directing the mobile telephone 15 to retune to a frequency of the macrocell 60. The macrocell 60 then sets up the phone call in accordance with known cellular procedures.

If the mobile telephone 15 is network registered with the HLR 75, however, the HLR 75 will obtain a routing number for the mobile telephone 15 from the VLR 80, and provide the routing number to the MTSO 70. The MTSO 70 will then deliver the incoming call directly to the mobile telephone 15 through the PSTN 110 in accordance with the procedures of the IS-41 signalling network 100. Thus, cellular traffic may be off-loaded from a macrocell 60 having a high volume of cellular subscribers to one or more microcells 10 located within the frequency coverage area of the macrocell 60. Moreover, regardless of whether a mobile telephone 15 is located in a macrocell 60 or a microcell 10 of a cellular system 1, the present invention ensures incoming call delivery to a mobile telephone 15.

Replacement Scenario

FIGS. 2A–2D show the operation of a microcellular system 2 integrated into a macrocellular system 1 according to a replacement scenario of the present invention as a mobile telephone 15 transitions from a macrocell 60 into the microcellular system 2 and then back to the macrocell 60. FIGS. 2A–2D represent the replacement scenario wherein at least one macrocell of the macrocellular system 1 is replaced by a microcellular system 2. Microcellular system 2 comprises at least one programmable border microcell 12 and an interior microcell area 19 including at least one programmable interior microcell 13 which together provide cellular telephone service in the off-load area formerly served by the macrocell. The border microcell 12 is essentially a microcell 10 which is located around the perimeter of the microcellular system 2 and is also substantially within the signal coverage area of at least one other remaining macrocell 60 of the macrocellular system 1. The interior microcell 13 is essentially a microcell 10 which is located adjacent the border microcell 12 and is substantially outside the signal coverage area of any macrocell 60. Both border microcell 12 and interior microcell 13 have transceiver 20 and transmit/receive antenna 30 for broadcasting and receiving signals within the signal coverage area of the microcell. They also both contain programmable parameters for Autonomous Registration, IS-41 Qualification Criterion, IS-41 Registration Criterion, IS-41 Inactive Criterion and Page Rebroadcast, as shown in Table 1.

TABLE 1

Individual Microcell Parameters

| INFORMATION ELEMENT | CONTENTS |
| --- | --- |
| Autonomous Registration | STATE<br>0 - off<br>1 - home mobiles only<br>2 - roaming mobiles only<br>3 - home and roaming mobiles<br>REGID SOURCE<br>0 - WCP clock<br>1 - REGIDs from a Monitor (CMM)<br>REGID OFFSET<br>REGINCR SOURCE<br>0 - fixed as follows |

TABLE 1-continued

Individual Microcell Parameters

| INFORMATION ELEMENT | CONTENTS |
| --- | --- |
| | 1 - REGINCRS from a Monitor (CMM)<br>REGINC |
| IS41 Qualification Criterion | STATE<br>0 - off<br>1 - Nth autonomous registration<br>2 - Nth call attempt |
| IS41 Registration Criterion | STATE<br>0 - off<br>1 - Nth autonomous registration<br>2 - Nth call attempt<br>3 - dialing pattern match<br>4 - Nth Autonomous Registration or page response |
| IS41 Inactive Criterion | STATE<br>0 - no autonomous registrations in N seconds<br>1 - no call attempts in N seconds<br>2 - call completions<br>3 - Nth autonomous registration if IS41 registered<br>4 - call completions and Nth autonomous registration if IS41 registered<br>REGISTRATION TIMEOUT |
| Page Rebroadcast | STATE<br>0 - off<br>1 - page from a Monitor (CMM) |

The macrocellular system 1 provides for Autonomous Registration. Autonomous Registration provides for automatic identification of the mobile telephone 15 with a macrocell 60 or a microcell 10. Similarly, Autonomous Registration may be performed by a mobile telephone 15 with a border microcell 12 or with an interior microcell 13. The IS-41 parameters provide for the selective registration of a mobile telephone 15 with the IS-41 signalling network 100 for call delivery and use of various calling features for a mobile telephone 15 located within the microcellular network 2. According to the present invention, registration of a mobile telephone 15 with the IS-41 signalling network 100 occurs only when the mobile telephone is located within the microcellular system 2 and satisfies programmable predetermined criteria. Otherwise, the mobile telephone 15 will remain home registered with the macrocellular system 1.

In a border microcell 12, the programmable parameters are preferably set as follows. The Autonomous Registration parameter is set to offset the REGID value broadcast to the mobile telephone by the REGINC value of the surrounding macrocell 60. The IS-41 Qualification Criterion parameter is set to occur on the first Autonomous Registration. The IS-41 Registration Criterion parameter is set to the first call attempt. The IS-41 Inactive Criterion parameter is set to call completions, or the first Autonomous Registration if a mobile telephone 15 is already registered with the IS-41 signalling network 100. The Page Rebroadcast parameter is set to retransmit page signals from the macrocell 60 and to provide a directed retry message in response to a page response signal from a mobile telephone 15.

In an interior microcell 13, the programmable parameters are preferably set as follows. The Autonomous Registration parameter is set to offset the REGID value broadcast to the mobile telephone by the REGINC value of the surrounding border microcells 12, thus providing an offset of the REGID value two times the REGINC value of the macrocell 60. The IS-41 Qualification Criterion parameter is set to off. The IS-41 Registration Criterion parameter is set to the first Autonomous Registration or a page response signal. The IS-41 Inactive Criterion parameter is set to no Autonomous Registration in N seconds. The Page Rebroadcast parameter is set to off.

The microcellular system 2 shown in FIGS. 2A–2D minimizes border problems during the transition of a mobile telephone 15 between a macrocell 60 and a border microcell 12 and also between a border microcell 12 and an interior microcell 13. The home registration of a mobile telephone 15 with the macrocellular system 1 is retained by delaying network registration through the IS-41 signalling network 100 until the mobile telephone 15 has reached an interior microcell 13, and canceling network registration through the IS-41 signalling network 100, if there is such registration, when the mobile telephone 15 reaches a border microcell 12. Accordingly, a mobile telephone 15 is normally home registered with the macrocellular system 1 and is only network registered with the IS-41 signalling network 100 when the mobile telephone 15 has arrived at and registered with an interior microcell 13.

Such a method of registration improves the probability of delivering an incoming call to the mobile telephone 15 because the mobile telephone 15 is not "lost" to the macrocellular system 1 upon the transitions between the macrocell 60, border microcell 12 and interior microcell 13. Moreover, because border microcells 12 rebroadcast page signals from the macrocells 60, a mobile telephone 15 which enters a border microcell 12 and locks onto a microcellular frequency but misses an Autonomous Registration with the border microcell 12 will still receive page signals rebroadcasted by the transceivers 20 of the border microcells 12 after the page signal is transmitted to the MSC 40 via the page monitor unit 90. In addition, an unsolicited page response signal from a mobile telephone 15 located in the border microcell 12 will cause a directed retry signal instructing the mobile telephone 15 to retune to a frequency of a macrocell 60. Thus, the border microcell 12 is a safe area where page signals are delivered and unsolicited page response signals are sent to the macrocellular system 1, thereby ensuring incoming call delivery to a mobile telephone 15. Furthermore, the mobile telephone 15 will be forced to autonomously register upon transition from the border microcell 12 to the interior microcell 13 as a result of the Autonomous Registration offset, thereby registering the mobile telephone 15 with the IS-41 signalling network 100 for call delivery directly to the mobile telephone 15.

Replacement Scenario: Macrocell to Border Microcell

Figure 2A:
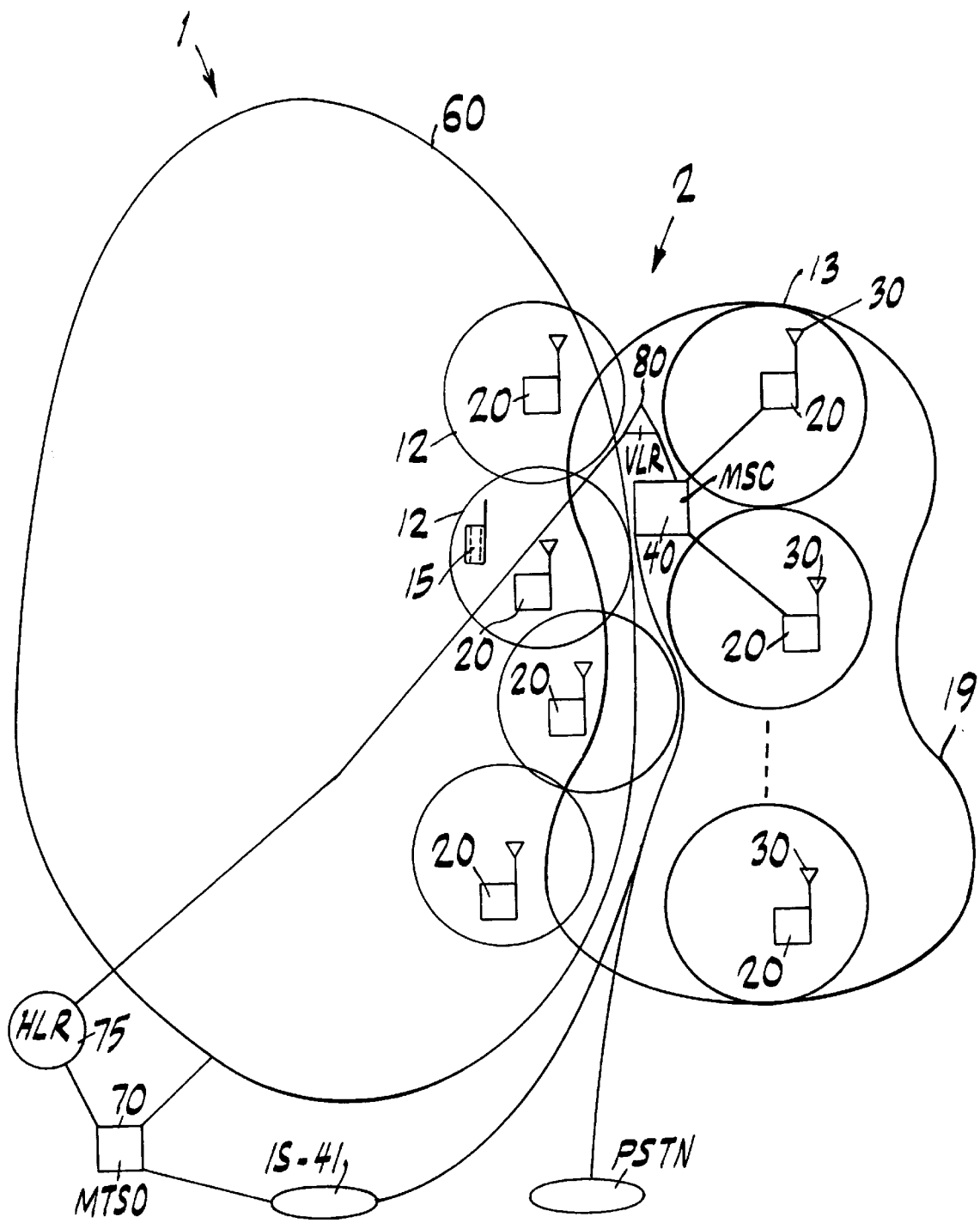
FIG. 2A illustrates the replacement scenario of the present invention as a mobile telephone transitions from a macrocell to a border microcell.

FIG. 2A illustrates a replacement scenario of the present invention as a mobile telephone 15 transitions from a macrocell 60 to a border microcell 12. The mobile telephone 15 is assumed to be home registered with the macrocellular system 1 and has locked onto a frequency of the border microcell 12 The REGID offset broadcast from the border microcell 12 stimulates the mobile telephone 15 to begin an Autonomous Registration with the border microcell 12 and initiates a System Access Task in accordance with EIA/TIA 553. Once the System Access Task is initiated by the mobile telephone 15, EIA/TIA 553 requires that the mobile telephone 15 rescan for the strongest control channel prior to making a reverse control channel access attempt. The mobile telephone 15 must then access the reverse control channel to complete Autonomous Registration. Thus, before the mobile telephone 15 completes Autonomous Registration, two events are possible due to the rescan.

When the mobile telephone 15 rescans, it may lock onto a border microcell 12 frequency as expected and complete Autonomous Registration with the border microcell 12. The Autonomous Registration of the mobile telephone 15 with the border microcell 12 will generate an IS-41 Qualification procedure because the border microcell 12 IS-41 Qualification Criterion parameter is set for the first Autonomous Registration. The IS-41 qualification procedure verifies that the mobile telephone 15 is qualified to receive cellular service and, for example, checks the mobile telephone 15 for credit and billing validation and receives a profile of the authorized calling features, such as call waiting. Thus, the qualification procedure prepares the mobile telephone 15 for prompt IS-41 registration. The mobile telephone 15 is not registered as being in the microcellular system 2, however, unless a call is attempted because the border microcell 12 IS-41 Registration Criterion parameter is set to the first call attempt. If the mobile telephone 15 does attempt to make an outgoing call, the mobile telephone 15 will be registered on the IS-41 signalling network 100. The mobile telephone 15 will be deregistered from the IS-41 signalling network 100 upon completion of the call attempt because the border microcell 12 IS-41 Inactive Criterion parameter is set to call completions.

After completing Autonomous Registration with the border microcell 12, the mobile telephone 15 must then rescan for the strongest control signal in accordance with EIA/TIA 553 and may lock onto a frequency of a macrocell 60, in which case the macrocell 60 will continue to broadcast a page signal for incoming calls to the mobile telephone 15 and will set up the incoming call in accordance with known cellular procedures. The mobile telephone 15, however, may rescan and lock onto a frequency of the border microcell 12 as normally expected. On an incoming call, the mobile telephone 15 will respond to a page signal rebroadcast from the border microcell 12 because the border microcell 12 Page Rebroadcast parameter is set to retransmit page signals from the macrocell 60. The mobile telephone 15 will respond to the rebroadcasted page signal with a page response signal, which in turn causes the border microcell 12 to send a directed retry signal, in accordance with EIA/TIA 553, to the mobile telephone 15 telling the mobile telephone 15 to retune to a frequency of the macrocell 60 because the border microcell 12 Page Rebroadcast parameter is set to provide a directed retry to page response signals. The macrocell 60 then sets up the incoming call in accordance with known cellular procedures.

After the mobile telephone 15 is stimulated by the REGID offset from the border microcell 12 to begin Autonomous Registration, the mobile telephone 15 will rescan but may lock onto a frequency of the macrocell 60 instead of the border microcell 12 and complete Autonomous Registration with the macrocell 60. Two events are now possible.

First, the mobile telephone 15 will rescan in accordance with EIA/TIA 553 and may lock onto a frequency of the macrocell 60, in which case the macrocell 60 continues to broadcast a page signal to the mobile telephone 15 for incoming calls. Second, the mobile telephone 15 will rescan and may lock onto a frequency of a border microcell 12. In this case, the border microcell 12 will rebroadcast a page signal from the macrocell 60 because the border microcell 12 Page Rebroadcast parameter is set to retransmit page signals. The mobile telephone 15 will respond to the rebroadcasted page signal with a page response signal, which in turn causes the border microcell 12 to send a directed retry signal to the mobile telephone 15 telling the mobile telephone 15 to retune to a frequency of the macrocell 60. The macrocell 60 then sets up the incoming call in accordance with known cellular procedures.

Replacement Scenario: Border Microcell to Interior Microcell

Figure 2B:
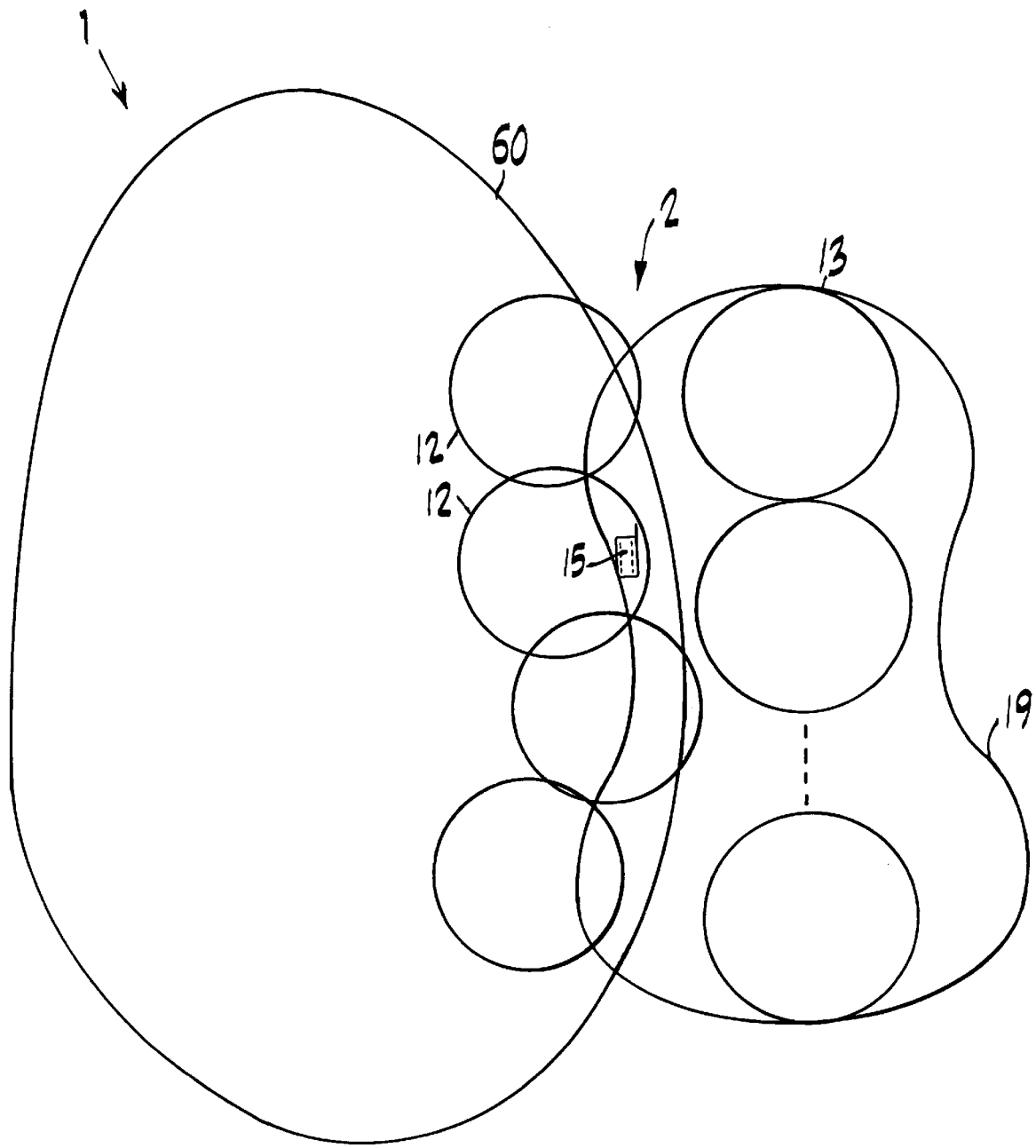
FIG. 2B illustrates the replacement scenario of the present invention as a mobile telephone transitions from a border microcell to an interior microcell.

FIG. 2B illustrates a replacement scenario of the present invention as a mobile telephone 15 transitions between a border microcell 12 and an interior microcell 13. The mobile telephone 15 is assumed to be home registered with the macrocellular system 1 and the mobile telephone 15 locks onto a frequency of the interior microcell 13. The REGID offset broadcast by the interior microcell 13 stimulates the mobile telephone 15 to begin an Autonomous Registration upon the transition of the mobile telephone 15 into the interior microcell 13. The mobile telephone 15 must rescan for the strongest available control channel in accordance with EIA/TIA 553 and then seize a reverse control channel. The mobile telephone 15 may lock onto a frequency of the interior microcell 13 and complete Autonomous Registration with the interior microcell 13. In this case, the mobile telephone 15 will register with the IS-41 signalling network 100 thereby informing the macrocellular system 1 that the mobile telephone 15 is now located in the microcellular network 2. Two events are now possible.

The first possibility is that the mobile telephone 15 rescans after completing Autonomous Registration in accordance with EIA/TIA 553 and locks onto a frequency of the border microcell 12. Until there is no Autonomous Registration with the interior microcell 13 in N seconds, incoming calls are delivered via the IS-41 signalling network 100 because the mobile telephone 15 is registered with the IS-41 signalling network 100. After no Autonomous Registration in N seconds by the mobile telephone 15 with the interior microcell 13, an IS-41 inactive message will be sent to the macrocellular system 1 because the interior macrocell 13 IS-41 Inactive Criterion parameter is set to no Autonomous Registration in N seconds. Once the mobile telephone 15 is deregistered from the IS-41 signalling network 100, the macrocellular system 1 will broadcast a page signal for incoming calls and the page signal will be rebroadcast by the border microcell 12. Thus, on an incoming call, the mobile telephone 15 will respond to a page signal rebroadcast by the border microcell 12 and the border microcell 12 will direct the mobile telephone 15 to retune to a frequency of a macrocell 60. The macrocell 60 will set up the incoming call.

The second possibility is that the mobile telephone 15 rescans and locks onto a frequency of the interior microcell 13 as normally expected. In this case, the mobile telephone 15 is already registered with the IS-41 signalling network 100 because the IS-41 Registration Criterion parameter is set to the first Autonomous Registration. Accordingly, incoming calls will be delivered according to the IS-41 signalling network 100 procedures.

After the mobile telephone 15 is stimulated by the REGID offset of the interior microcell 13 to begin an Autonomous Registration with the interior microcell 13, the mobile telephone 15 will rescan and may lock onto a frequency of a border microcell 12 instead of the interior microcell 13 and complete Autonomous Registration with the border microcell 12. In this case, the mobile telephone 15 is registered with the border microcell 12 but thinks that it has completed Autonomous Registration with the interior microcell 13. Two events are now possible.

First, the mobile telephone 15 will rescan after completing Autonomous Registration with the border microcell 12 and may lock onto a frequency of the border microcell 12. In this situation, the mobile telephone 15 will operate in accordance with the parameters of the border microcell 12 as described previously.

The second possibility is that the mobile telephone 15 will rescan and may lock onto a frequency of the interior microcell 13. In this case, the mobile telephone 15 will still operate in accordance with the parameters of the border microcell 12 because the mobile telephone 15 has completed Autonomous Registration with the border microcell 12. There is no Autonomous Registration stimulated by the interior microcell 13 in this situation because when the mobile telephone 15 was initially stimulated to attempt Autonomous Registration with the interior microcell 13, the mobile telephone 15 stored the REGID value broadcast by the interior microcell 13. Now that the mobile telephone 15 has re-locked onto the interior microcell 13, the current REGID value received by the mobile telephone does not stimulate an Autonomous Registration.

Therefore, on an incoming call, the page monitor unit 90 will detect a page signal from the macrocellular system 1 and the page signal will be rebroadcasted by the border microcell 12 because the Page Rebroadcast parameter of the border microcell is set on. The mobile telephone 15 will not respond to the page signal, however, because the mobile telephone 15 is now locked onto a frequency of the interior microcell 13. A first page response timeout will be detected by the MSC 40 and the MSC 40 will check its internal database and note that the mobile telephone 15 is actively registered with the border microcell 12. The MSC 40 will then internally generate an ISPAGE message to the Visitor Location Register (VLR) 80 associated with the border microcell 12. In response, the VLR 80 will internally generate and send a page signal to the interior microcells 13 associated with the VLR 80 through the MSC 40. When a mobile telephone 15 responds to the page signal originated by the VLR 80, the MSC 40 associated with the interior microcell 13 where the mobile station 15 is located will register the mobile station on the IS-41 signalling network 100 because the interior microcell 13 IS-41 Registration Criterion is set for page response signals as well as the first Autonomous Registration. The incoming call will either be delivered via IS-41 procedures or given a no response message depending on the macrocellular system's response to IS-41 registration during call delivery. Further incoming calls to the mobile telephone 15 will be delivered through IS-41 signalling network 100 procedures once the mobile telephone 15 is registered on the IS-41 signalling network 100. Alternatively, upon receiving a page response or signal, the interior microcell 13 may be programmed to direct the mobile telephone 15 to retune to a macrocell 60 frequency so that the macrocell 60 sets up and delivers the incoming call.

Replacement Scenario: Interior Microcell to Border Microcell

Figure 2C:
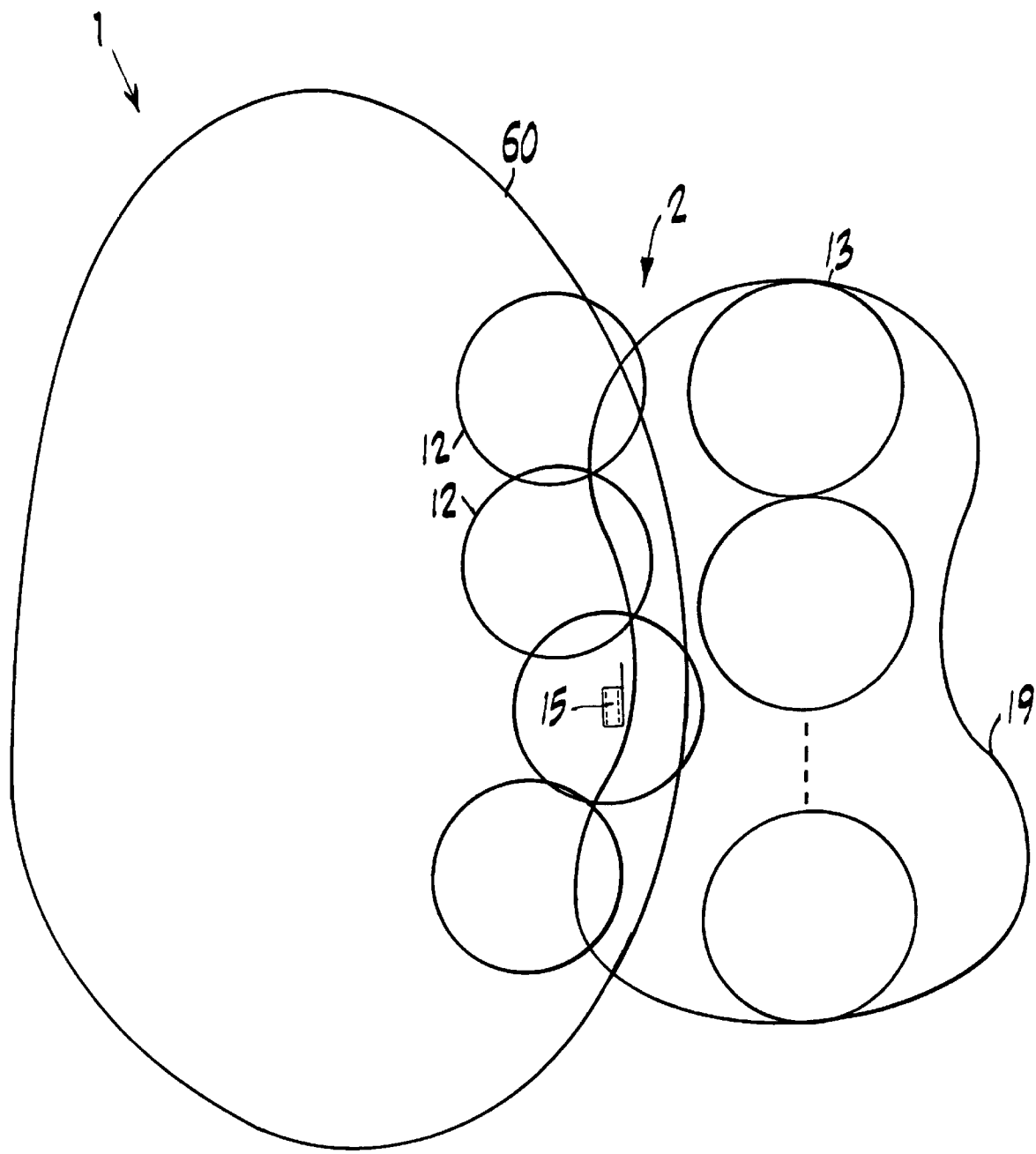
FIG. 2C illustrates the replacement scenario of the present invention as a mobile telephone transitions from an interior microcell to a border microcell.

FIG. 2C illustrates a replacement scenario of the present invention as a mobile telephone 15 transitions from an interior microcell 13 to a border microcell 12. The mobile telephone 15 is assumed to be network registered with the microcellular network 2 and then locks onto a border microcell 12. The REGID offset from the interior microcell 13 differs from the REGID offset of the border microcell 12 and stimulates the mobile telephone 15 to begin an Autonomous Registration attempt with the border microcell 12. The mobile telephone 15 rescans for the strongest available control channel in accordance with EIA/TIA 553 and then seizes a reverse control channel.

The mobile telephone 15 may lock onto a frequency of the interior microcell 13 and complete Autonomous Registration with interior microcell 13. In this case, the mobile telephone is registered with the IS-41 signalling network 100 because the interior microcell 13 IS-41 Registration Criterion parameter is set for the first Autonomous Registration.

The mobile telephone 15 must then rescan the control channels in accordance with EIA/TIA 553 and may lock onto a frequency of the border microcell 12. On the other hand, the mobile telephone may lock onto a frequency of the interior microcell 13. In either situation, incoming calls are delivered via the IS-41 signalling network 100 procedures because the mobile telephone 15 is registered with the IS-41 signalling network 100. Until there is no Autonomous Registration in N seconds, incoming calls are delivered via the IS-41 signalling network 100. After no Autonomous Registrations by the mobile telephone 15 with the interior microcell 13 in N seconds, an IS-41 inactive message will be sent out to the macrocellular system 1 because the interior macrocell 13 IS-41 Inactive Criterion parameter is set to no Autonomous Registration in N seconds, thereby causing the macrocellular system 1 to broadcast a page signal for incoming calls which is rebroadcasted by the border microcell 12. The mobile telephone 15 will respond to the rebroadcasted page signal as discussed previously.

After the mobile telephone 15 is stimulated by the REGID offset of the border microcell 12 to begin an Autonomous Registration attempt with the border microcell 12, the mobile telephone 15 will rescan and may lock onto a frequency of the border microcell 12 instead of the interior microcell 13 and complete Autonomous Registration with the border microcell 12. In this case, the Autonomous Registration of the mobile telephone 15 with the border microcell 12 will cause an IS-41 Inactive message to be sent to the macrocellular system 1 because the border microcell 12 IS-41 Inactive Criterion parameter is set for the first Autonomous Registration if the mobile telephone is already registered as being in the microcellular system 2 upon entering the border microcell 12. The IS-41 Inactive message will cause the macrocellular system to broadcast a page signal for incoming calls. Two events are now possible.

First the mobile telephone 15 will rescan in accordance with the EIA/TIA 553 specification and may lock onto a frequency of the border microcell 12 as normally expected. In this case, the border microcell will rebroadcast a page signal from the macrocell because the border microcell 12 Page Rebroadcast parameter is set to retransmit page signals. The mobile telephone 15 will respond to the rebroadcasted page signal with a page response signal, which in turn causes the border microcell 12 to send a directed retry signal to the mobile telephone 15 telling the mobile telephone 15 to retune to a frequency of the macrocell 60. The macrocell 60 then sets up the incoming call in accordance with known cellular procedures.

The other possibility is that the mobile telephone 15 will rescan and may lock onto a frequency of the interior microcell 13. On an incoming call, the page monitor unit 90 will detect a page signal from the macrocellular system 1 and the page signal will be rebroadcasted by the border microcell 12 because the Page Rebroadcast parameter of the border microcell is set on. The mobile telephone 15 will not respond to the page signal, however, because the mobile telephone 15 is now locked onto a frequency of the interior microcell 13. A first page response timeout will be detected by the MSC 40 and the MSC 40 will check its internal database and note that the mobile telephone 15 is actively registered with the border microcell 12. The MSC 40 will then internally generate an ISPAGE message to the Visitor Location Register (VLR) 80 associated with the border microcell 12. In response, the VLR 80 will internally generate and send a page signal to the interior microcells 13 associated with the VLR 80 through the MSC 40. When a mobile telephone 15 responds to the page signal originated by the VLR 80, the MSC 40 associated with the interior microcell 13 where the mobile station 15 is located will register the mobile station on the IS-41 signalling network 100 because the interior microcell 13 IS-41 Registration Criterion is set for page response signals as well as the first Autonomous Registration. The incoming call will either be delivered via IS-41 procedures or given a no response message depending on the macrocellular system's response to IS-41 registration during call delivery. Further incoming calls to the mobile telephone 15 will be delivered through IS-41 signalling network 100 procedures once the mobile telephone 15 is registered on the IS-41 signalling network 100. Alternatively, upon receiving a page response or signal, the interior microcell 13 may be programmed to direct the mobile telephone 15 to retune to a macrocell 60 frequency so that the macrocell 60 sets up and delivers the incoming call.

Replacement Scenario: Border Microcell to Macrocell

Figure 2D:
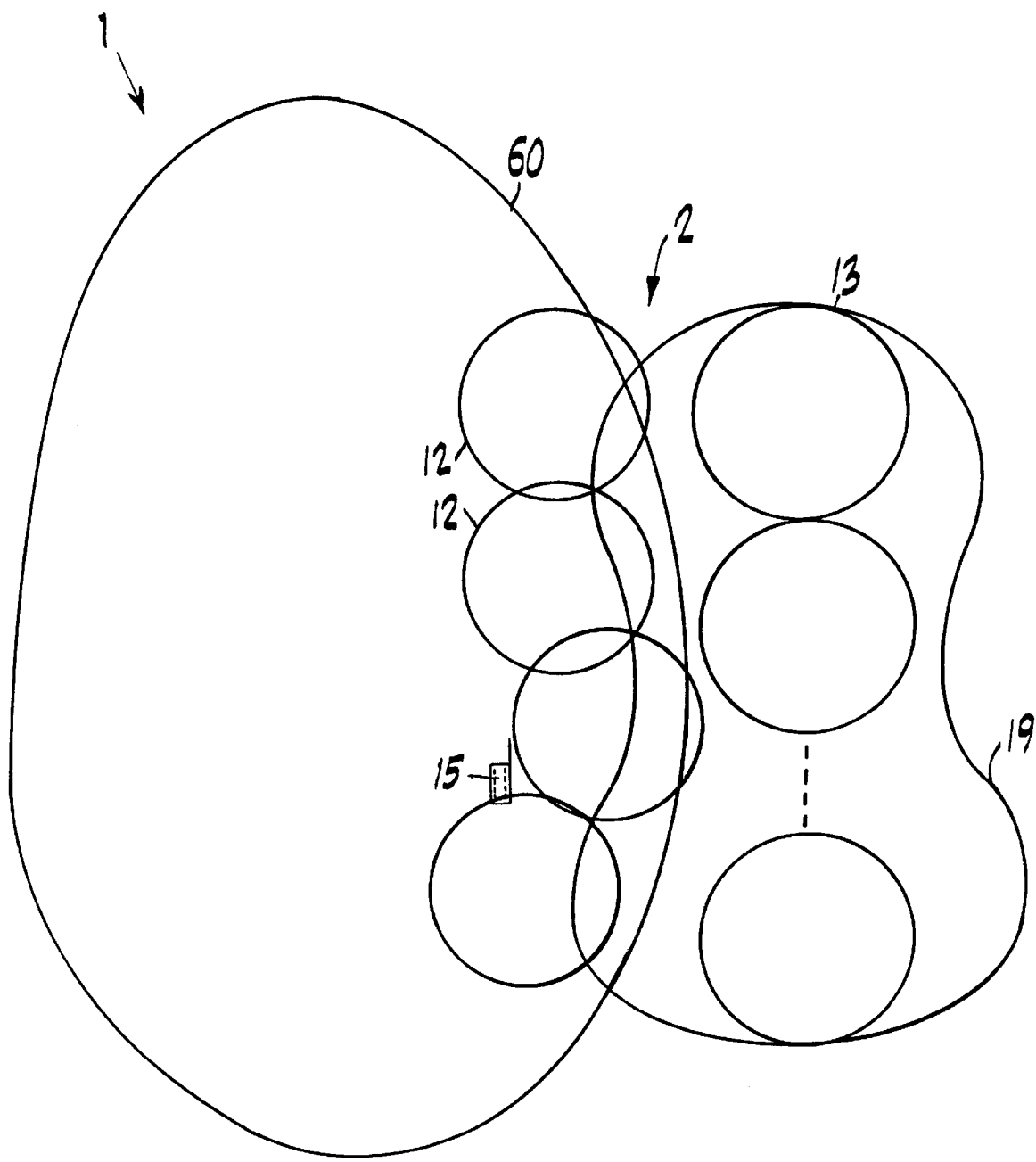
FIG. 2D illustrates a replacement scenario of the present invention as a mobile telephone transitions from a border microcell to a macrocell.

FIG. 2D illustrates a replacement scenario of the present invention as a mobile telephone 15 transitions from a border microcell 12 to a macrocell 60. The mobile telephone 15 is assumed to be listed as home registered with the macrocellular system and locks onto a frequency of a macrocell 60. The REGID offset from the border microcell 12 differs from the macrocell 60 REGID value and stimulates the mobile telephone 15 to begin Autonomous Registration with the macrocell 60. After the mobile telephone 15 is stimulated to begin Autonomous Registration with the macrocell 60, the mobile telephone 15 must rescan for the strongest available control channel in accordance with EIA/TIA 553. The mobile telephone 15 may lock onto a frequency of the macrocell 60 and complete Autonomous Registration with the macrocell 60. Two events are now possible.

First, the mobile telephone must rescan in accordance with EIA/TIA 553 and may lock onto a frequency of the macrocell 60 as normally expected. In this situation, the macrocell 60 will broadcast a page signal for incoming calls, receive a page response signal from a mobile telephone 15, and will set up the call. If the mobile telephone 15 locks onto a frequency of the border microcell 12, however, then the border microcell 12 will rebroadcast a page signal from the macrocell 60 because the border microcell 12 Page Rebroadcast parameter is set to retransmit page signals. The mobile telephone 15 will respond to the rebroadcasted page signal with a page response signal, which in turn causes the border microcell 12 to send a directed retry signal to the mobile telephone 15 telling the mobile telephone 15 to retune to a frequency of the macrocell 60. The macrocell 60 then sets up the incoming call in accordance with known cellular procedures After the mobile telephone 15 is stimulated to begin an Autonomous Registration attempt with the macrocell 60, the mobile telephone 15 must rescan in accordance with EIA/TIA 553 and may lock onto a frequency of a border microcell 12 instead of a macrocell 60, and complete Autonomous Registration with the border microcell 12. Two events are now possible.

First, the mobile telephone 15 must rescan for the strongest control channel in accordance with EIA/TIA 553 and may lock onto a frequency of the border microcell 12. In this case, the border microcell 12 will rebroadcast a page signal from the macrocell because the border microcell 12 Page Rebroadcast parameter is set to retransmit page signals. The mobile telephone 15 will respond to the rebroadcasted page signal with a page response signal, which in turn causes the border microcell 12 to send a directed retry signal to the mobile telephone 15 telling the mobile telephone 15 to retune to a frequency of the macrocell 60. The macrocell 60 then sets up the incoming call in accordance with known cellular procedures.

The mobile telephone 15, however, may lock onto a frequency of the macrocell 60. In this instance, then the mobile telephone 15 will respond to the page signal broadcast by the macrocell 60 by providing a page response signal. Once the macrocell 60 receives the page response signal from the mobile telephone 15, the macrocell 60 sets up the phone call in accordance with known cellular procedures.

Underlay Scenario

Figure 3A:
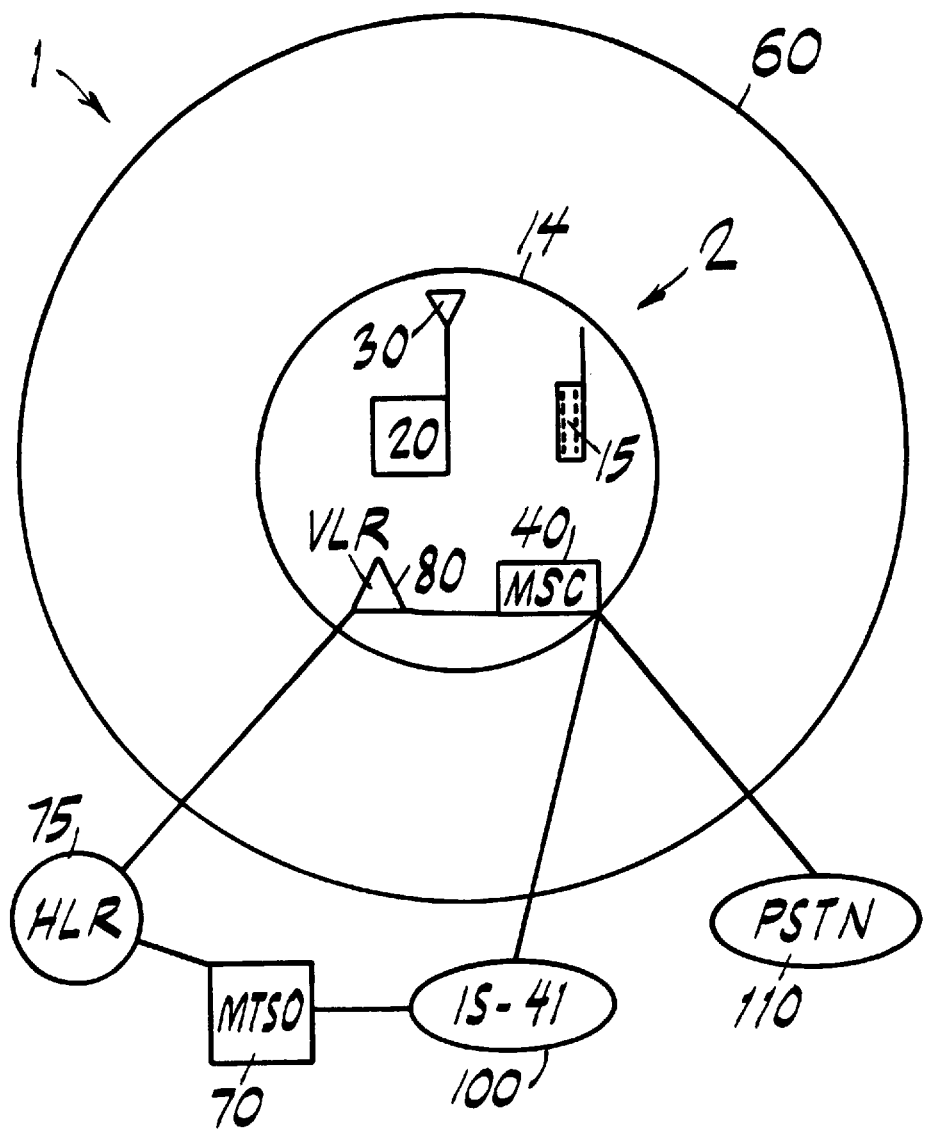
FIG. 3A shows an underlay scenario of the present invention as a mobile telephone transitions from a macrocell to an underlay microcell.
Figure 3B:
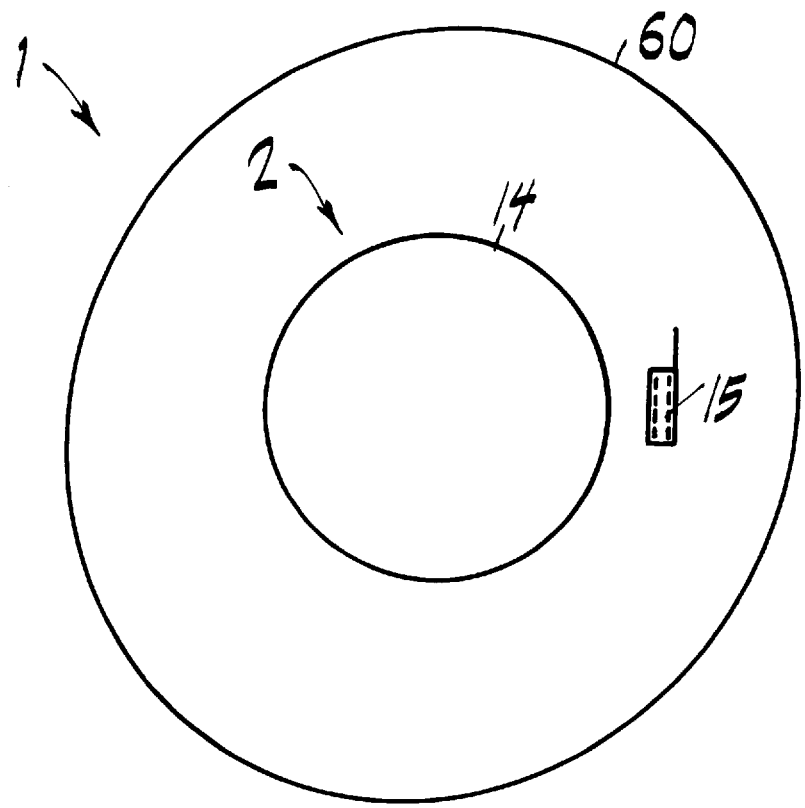
FIG. 3B shows an underlay scenario of the present invention as a mobile telephone transitions from an underlay microcell to a macrocell.

FIGS. 3A and 3B show the operation of a microcellular system 2 of a macrocellular system 1 according to an underlay scenario of the present invention. FIGS. 3A and 3B represent an underlay scenario wherein a macrocell 60 includes within its signal coverage area a microcellular system 2 having at least one underlay microcell 14. An underlay microcell 14 is essentially a microcell 10 that is within the signal coverage area of a macrocell 60. Thus, an underlay scenario allows a macrocell 60 having an area of high cellular subscriber usage to offload the high usage area onto a microcellular system 2.

The macrocellular system 1 provides for Autonomous Registration. In an underlay microcell 14, the programmable parameters are preferably set as follows. The Autonomous Registration parameter is set to offset the REGID value broadcasted to the mobile telephone 15 by the REGINCR value of the surrounding macrocell 60. The IS-41 Qualification Criterion parameter is set to occur on the first Autonomous Registration. The IS-41 Registration Criterion parameter is set to the first call attempt or optionally, to N Autonomous Registrations to ensure that the mobile telephone 15 is pedestrian traffic. The IS-41 Inactive Criterion parameter is set to the first call completion or optionally, to no Autonomous Registration in N seconds. The Page Rebroadcast Criterion parameter is set to retransmit pages and give directed retry to page responses from retransmitted page signals.

A microcellular system 2 according to the underlay scenario of the present invention minimizes border problems during the transition of a mobile telephone 15 between a macrocell 60 and an underlay microcell 14 by maintaining the home registration of the mobile telephone 15 with the macrocellular system 1 unless the mobile telephone 15 is attempting to make a call or alternatively has completed N Autonomous Registrations with the underlay microcell 14, in which case the mobile telephone is then registered with the IS-41 signalling network 100. Such a method of registration ensures that page signals are received by the mobile telephone 15 and thereby improves the probability of delivering an incoming call to a mobile telephone 15 because the mobile telephone 15 is not "lost" upon the transition between the macrocell 60 and the underlay microcell 14.

Underlay Scenario: Macrocell to Underlay Microcell

FIG. 3A shows an underlay scenario of the present invention as a mobile telephone transitions from a macrocell 60 to an underlay microcell 14. The mobile telephone 15 is assumed to be home registered with the macrocellular system 1 and locked onto a frequency of an underlay microcell 14. The REGID offset signal broadcast from the underlay microcell 14 stimulates the mobile telephone 15 to begin an Autonomous Registration with the underlay microcell 14. After the mobile telephone 15 is stimulated for Autonomous Registration, the mobile telephone 15 rescans for the strongest control channel in accordance with EIA/TIA 553 and then seizes a reverse control channel.

When the mobile telephone 15 rescans, it may lock onto an underlay microcell 14 frequency and complete Autonomous Registration with the underlay microcell 14. In this situation, the mobile telephone 15 has registered with the underlay microcell 14 and is qualified on the IS-41 signalling network 100 to make outgoing calls because the underlay microcell 14 IS-41 Qualification Criterion parameter is set for the first Autonomous Registration. The mobile telephone 15 is not registered as being in the microcellular system 2, however, unless a call is attempted because the underlay microcell 14 IS-41 Registration Criterion parameter is set to the first call attempt. If the mobile telephone 15 does attempt to make an outgoing call, the mobile telephone 15 will be registered on the IS-41 signalling network 100 in accordance with the underlay microcell 14 IS-41 Registration Criterion parameter, and then deregistered from the IS-41 signalling network 100 upon completion of the call attempt because the underlay microcell 14 IS-41 Inactive Criterion parameter is set to call completions. Two events are now possible.

First, the mobile telephone 15 will rescan in accordance with EIA/TIA 553 and may lock onto a frequency of the macrocell 60, in which case the macrocellular system 1 will continue to broadcast page signals for incoming calls and set up the call in accordance with known cellular procedures.

The other possibility is that the mobile telephone 15 will rescan and may lock onto a frequency of the underlay microcell 14 as normally expected. On an incoming call, the mobile telephone 15 will respond to a page signal rebroadcasted from the underlay microcell 14 because the underlay microcell 14 Page Rebroadcast parameter is set to retransmit page signals from the macrocell 60. The mobile telephone 15 will respond to the rebroadcasted page signal with a page response signal, which in turn causes the underlay microcell 14 to send a directed retry signal, in accordance with EIA/TIA 553, to the mobile telephone 15 directing the mobile telephone 15 to retune to a frequency of the macrocell 60. The macrocell 60 then sets up the incoming call in accordance with known cellular procedures.

When the mobile telephone 15 is stimulated to attempt Autonomous Registration and then rescans, however, it may lock onto a frequency of the macrocell 60 instead of the underlay microcell 14 and complete Autonomous Registration with the macrocell 60. When the mobile telephone 15 again rescans in accordance with EIA/TIA 553, it may lock onto a frequency of the macrocell 60, in which case the macrocellular system 1 will continue to broadcast page signals for incoming calls and set up the calls in accordance with known cellular procedures. The mobile telephone 15 may, however, lock onto a frequency of the underlay microcell 14. Thus, on an incoming call, the mobile telephone 15 will respond to a page signal rebroadcast from the underlay microcell 14 as set forth above.

Underlay Scenario: Underlay Microcell to Microcell

FIG. 3B shows an underlay scenario of the present invention as a mobile telephone 15 transitions from an underlay microcell 14 to a macrocell 60. The mobile telephone 15 is assumed to be home registered with macrocellular system 1 and has locked onto a frequency of the macrocell 60. The REGID offset broadcast by the underlay microcell 14 differs from the REGID value broadcast by the macrocell 60 and stimulates the mobile telephone 15 to begin Autonomous Registration with the macrocell 60. Before the mobile telephone 15 completes its Autonomous Registration procedure, the mobile telephone 15 must rescan for the strongest control channel in accordance with EIA/TIA 553. Two events are now possible.

When the mobile telephone 15 rescans, it may lock onto a frequency of the macrocell 60 and complete Autonomous Registration with the macrocell 60. The mobile telephone 15 must again rescan in accordance with EIA/TIA 553 and may lock onto a frequency of the macrocell 60, in which case the macrocellular system 1 will continue to broadcast page signals for incoming calls and set up the calls according to known cellular procedures. The mobile telephone 15 may, however, lock onto a frequency of the underlay microcell 14. Thus, on an incoming call, the mobile telephone 15 will respond to a page signal rebroadcast from the underlay microcell 14 because the underlay microcell 12 Page Rebroadcast parameter is set to retransmit page signals from the macrocell 60. The mobile telephone 15 will respond to the rebroadcasted page signal with a page response signal, which in turn causes the underlay microcell 12 to send a directed retry signal to the mobile telephone 15 directing the mobile telephone 15 to retune to a frequency of the macrocell 60. The macrocell 60 then sets up the incoming call in accordance with known cellular procedures.

After the mobile telephone 15 is stimulated to begin Autonomous Registration with the macrocell 60 and then rescans, however, it may lock onto a frequency of the underlay microcell 14 and complete Autonomous Registration with the underlay microcell 14. The mobile telephone 15 again rescans in accordance with EIA/TIA 553 and may lock onto a frequency of the underlay microcell 14. Thus, on an incoming call, the mobile telephone 15 will respond to a page signal rebroadcast from the underlay microcell 14 as discussed previously. If the mobile telephone 15 locks onto a frequency of the macrocell 60 after rescanning, however, then the macrocell 60 will set up incoming calls in accordance with known cellular procedures.

Partial Underlay Scenario

Figure 4A:
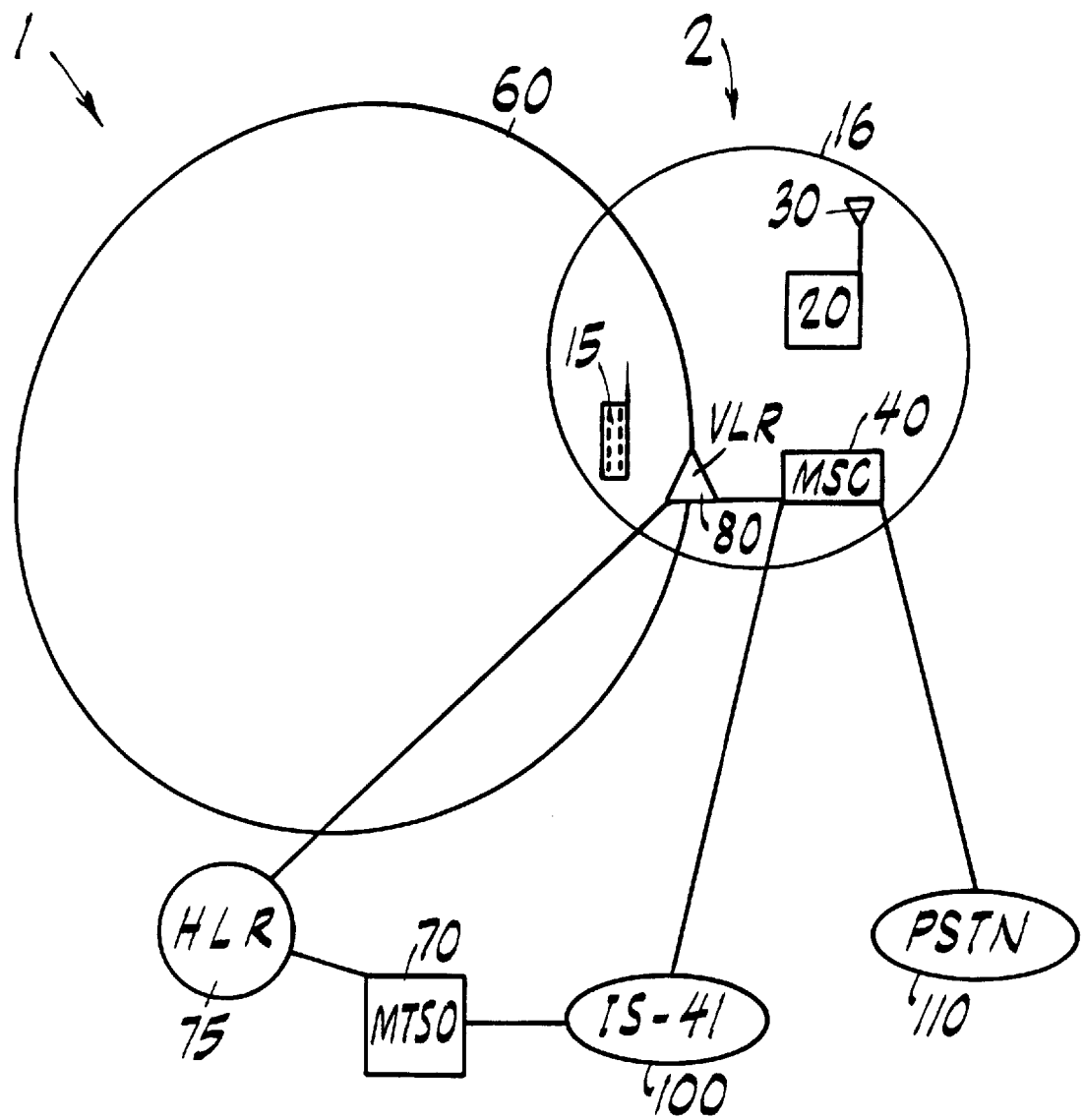
FIG. 4A illustrates a partial underlay scenario of the present invention as a mobile telephone transitions from a macrocell to a partial underlay microcell.
Figure 4B:
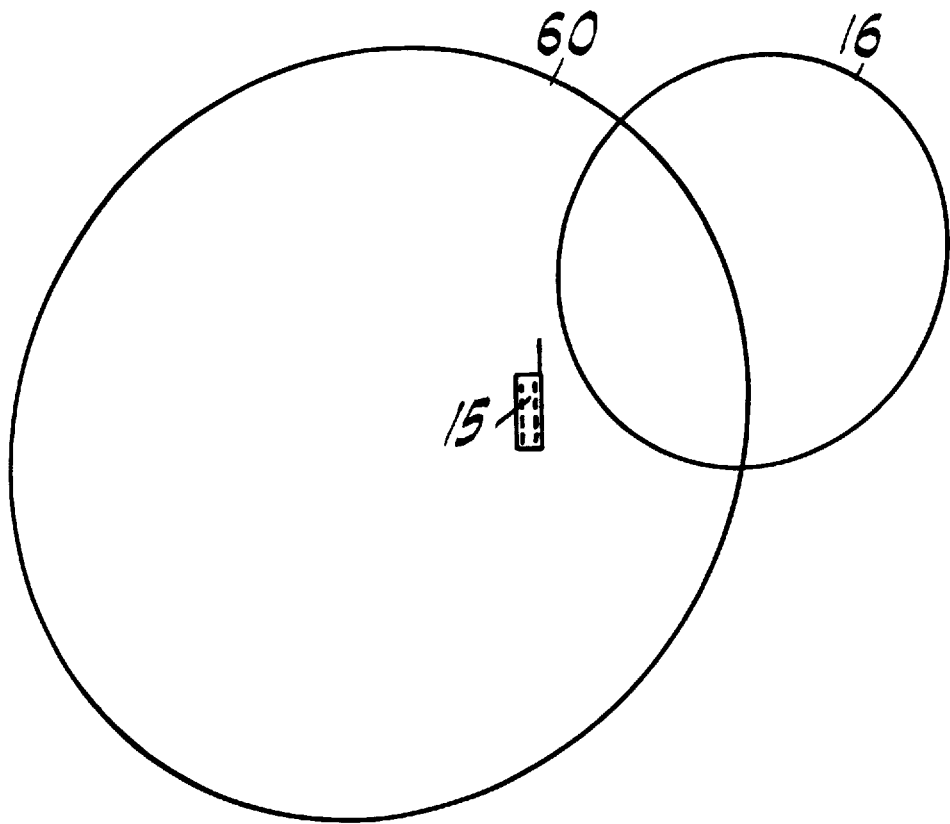
FIG. 4B illustrates a partial underlay scenario of the present invention as a mobile telephone transitions from a partial underlay microcell to a macrocell.

FIGS. 4A and 4B show the operation of a microcellular system 2 according to a partial underlay scenario wherein at least one partial underlay microcell 16 is partially within the signal coverage area of at least one macrocell 60 of a macrocellular system 1. The partial underlay microcell 16 is essentially a microcell 10 that is at least partially within the signal coverage area of a macrocell 60. The macrocellular system 1 is set for Autonomous Registration.

In a partial underlay microcell 16, the programmable parameters are preferably set as follows. The Autonomous Registration parameter is set to offset the REGINC value broadcast to the mobile telephone 15 by the REGINC value from the surrounding macrocell 60. The IS-41 Qualification Criterion parameter is set to occur on the first Autonomous Registration. The IS-41 Registration Criteria parameter is set to the first call attempt or the Nth Autonomous Registration. The IS-41 Inactive Criterion parameter is set to no Autonomous Registration in N seconds. The Page Rebroadcast parameter is set to retransmit page signals and give directed retry to page responses from retransmitted pages.

A microcellular system 2 according to the partial underlay scenario of the present invention minimizes border problems during the transition of a mobile telephone 15 between a macrocell 60 and a partial underlay microcell 16. The home registration of the mobile telephone 15 is maintained with the macrocellular system 1 until N Autonomous Registrations with the partial underlay microcell 16 have been completed by the mobile telephone 15. N may be set to a small number to quickly register the mobile telephone 15 with the IS-41 signalling network 100, thereby ensuring incoming call delivery through page rebroadcasting and directed retry or through the IS-41 signalling network 100, regardless of the location of the mobile telephone 15 within the microcellular system 2. The requirement for N Autonomous Registrations ensures that network registration will only be provided to subscribers likely to remain in the microcellular network 2 as opposed to a subscriber (e.g., an automobile mobile telephone) that is merely passing through the microcellular network 2. Such a method of registration ensures that page signals are received by a mobile telephone 15 and thereby improves the probability of delivering an incoming call to a mobile telephone 15 because the mobile telephone 15 is not "lost" upon the transition between the macrocell 60 and the partial underlay microcell 16.

Partial Underlay Scenario: Macrocell to Partial Underlay Microcell

FIG. 4A illustrates a partial underlay scenario of the present invention as a mobile telephone 15 transitions from a macrocell 60 to a partial underlay microcell 16. The mobile telephone 15 is assumed to be home registered on the macrocellular system 1 and then locks onto a frequency of a partial underlay microcell 16. The REGID offset broadcast by the partial underlay microcell 16 stimulates the mobile telephone 15 to begin an Autonomous Registration with the partial underlay microcell 16. After the mobile telephone 15 is stimulated to begin Autonomous Registration, the mobile telephone 15 rescans for the strongest control channel in accordance with EIA/TIA 553 and then seizes a reverse control channel.

When the mobile telephone 15 rescans, it may lock onto a frequency of the partial underlay microcell 16 and complete Autonomous Registration with the partial underlay microcell 16. In this case, the mobile telephone 15, in accordance with the partial underlay microcell 16 parameters, is qualified with the IS-41 signalling network 100 to make calls but is not registered as being located in the microcellular system 2 unless a call is attempted or the prerequisite number of Autonomous Registrations have been completed. Two events are now possible.

First, the mobile telephone 15 will rescan in accordance with EIA/TIA 553 and may lock onto a frequency of the macrocell 60. In this instance, the macrocell 60 will continue to broadcast a page signal for incoming calls and set up the calls according to known cellular procedures.

The other possibility is that the mobile telephone 15 will rescan and lock onto a frequency of the partial underlay microcell 16 as normally expected. On an incoming call, the mobile telephone 15 will respond to a page signal rebroadcast from the partial underlay microcell 16 because the partial underlay microcell 16 Page Rebroadcast parameter is set to retransmit page signals from the macrocell 60. The mobile telephone 15 will respond to the rebroadcasted page signal with a page response signal, which in turn causes the partial underlay microcell 16 to send a directed retry signal to the mobile telephone 15 telling the mobile telephone 15 to retune to a frequency of the macrocell 60. The macrocell 60 then sets up the incoming call in accordance with known cellular procedures. If the mobile telephone 15 is beyond the frequency coverage area of the macrocell 60 and has not been network registered via the IS-41 signalling network 100, then the mobile telephone 15 will be unable to access the frequency of the macrocell 60 and incoming calls will not be delivered.

After the mobile telephone 15 is stimulated to attempt Autonomous Registration with the partial underlay microcell 16 and then rescans, however, it may lock onto a frequency of the macrocell 60 and complete Autonomous Registration with the macrocell 60. The mobile telephone 15 will rescan in accordance with EIA/TIA 553 and may lock onto a frequency of the macrocell 60. In this instance, the macrocell 60 will continue to broadcast a page signal for incoming calls and set up the calls according to known cellular procedures. The other possibility is that the mobile telephone 15 will rescan and lock onto a frequency of the partial underlay microcell 16. On an incoming call, the mobile telephone 15 will respond to a page signal rebroadcast from the partial underlay microcell 16 as discussed previously.

Partial Underlay Scenario: Partial Underlay Microcell to Macrocell

FIG. 4B illustrates a partial underlay scenario of the present invention as mobile telephone 15 transitions from a partial underlay microcell 16 to a macrocell 60. It is assumed that the mobile telephone is network registered with the macrocellular system 1 as being in the microcellular system 20 If the mobile telephone 15 has missed at least N Autonomous Registrations, however, then its network registration will be inactivated and the mobile will be home registered with the macrocellular system 1. The REGID offset broadcast from the partial underlay microcell 16 differs from the REGID value broadcast by the macrocell 60 and stimulates the mobile telephone 15 to begin an Autonomous Registration attempt with the macrocell 60. After the mobile telephone 15 is stimulated to attempt an Autonomous Registration, the mobile telephone 15 rescans for the strongest control channel in accordance with EIA/TIA 553 and then seizes a reverse control channel.

When the mobile telephone 15 rescans, it may lock onto a frequency of the macrocell 60 and complete Autonomous Registration with the macrocell 60. Two events are now possible.

First, the mobile telephone 15 will rescan in accordance with EIA/TIA 553 and may lock onto a frequency of the macrocell 60 as expected. In this case, the macrocell 60 will register the mobile telephone with the HLR 75 as being home registered and the HLR will cancel the network registration of the mobile telephone 15. On an incoming call, the mobile telephone 15 will respond to the page signal broadcast by the macrocell 60 by providing a page response signal. Once the macrocell 60 receives the page response signal from the mobile telephone 15, the macrocell 60 sets up the phone call in accordance with known cellular procedures.

The other possibility is that the mobile telephone 15 will rescan and lock onto a frequency of the partial underlay microcell 16. On an incoming call, the mobile telephone 15 will respond to a page signal rebroadcast from the partial underlay microcell 16 as discussed previously.

When the mobile telephone 15 is stimulated to begin an Autonomous Registration with the macrocell 60 and then rescans, however, it may lock onto a frequency of the partial underlay microcell 16 and complete Autonomous Registration with the partial underlay microcell 16. In this case, the mobile telephone 15, in accordance with the partial underlay microcell 16 parameters, is qualified with the IS-41 signalling network 100 to make calls but not registered with the IS-41 signalling network 100 unless a call is attempted or the prerequisite number of Autonomous Registrations are completed. Two events are now possible.

First, the mobile telephone 15 will rescan in accordance with EIA/TIA 553 and may lock onto a frequency of the partial underlay microcell 16. On an incoming call, the mobile telephone 15 will respond to a page signal rebroadcasted by the partial underlay microcell 16 with a page response signal. The partial underlay microcell 16 will then provide a directed retry message to the mobile telephone 15 to retune to a frequency of the macrocell 60. Alternatively, the partial underlay microcell 16 may be programmed to register the mobile telephone 15 with the IS-41 signalling network 100 as a result of the page response signal, in which case the incoming call will be delivered via with IS-41 signalling network 100.

Second, the mobile telephone 15 will rescan and may lock onto a frequency of the macrocell 60. Once the mobile telephone 15 fails to complete N Autonomous Registrations with the partial underlay microcell 16, an IS-41 Inactive message will be sent to the macrocellular system 1 to deregister the mobile telephone 15 from the IS-41 signalling network 100 if the mobile telephone is already network registered. The macrocell 60 will then broadcast a page signal for incoming calls and set up the call according to known cellular procedures.

What is claimed is:

1. A method for registering a mobile unit with a microcellular system when the mobile unit enters the microcellular system from a macrocellular system adjacent to the microcellular system, the mobile unit maintaining registration information, the method comprising the steps of:

providing a first offset signal from the microcellular system to the mobile unit for modifying the registration information when the mobile unit enters the microcellular system from the macrocellular system; and registering the mobile unit with the microcellular system in response to the modifying of the registration information.

2. The method of claim 1, wherein the mobile unit stores the registration information in a storage location.

3. The method of claim 1, wherein the registration information represents a REGID signal generated by the microcellular system, the REGID signal complying with EIA/TIA 553 guidelines.

4. The method of claim 1, wherein the macrocellular system includes at least one first cell having a first transceiver for transmitting and receiving signals in a signal coverage area, and wherein the microcellular system includes at least one border cell having a second transceiver for transmitting and receiving signals and being substantially within the signal coverage area of the first transceiver, the microcellular system further including at least one interior cell having a third transceiver for transmitting and receiving signals and being substantially outside the signal coverage area of the first transceiver, and wherein the providing step further includes the step of:

providing the first offset signal from the second transceiver in the at least one border cell to the mobile unit.

5. The method of claim 4, wherein the first offset signal is a REGINCR signal determined by the macrocellular system, the REGINCR signal complying with EIA/TIA 553 guidelines.

6. The method of claim 4, wherein the providing step further includes the step of:

provide a second offset signal from the third transceiver to the mobile unit for offsetting the registration identification information maintained by the mobile unit.

7. The method of claim 6, wherein the second offset signal is a REGINCR signal, the REGINCR signal complying with EIA/TIA 553 guidelines.

8. The method of claim 1, wherein the macrocellular system includes at least one first cell having a first transceiver for transmitting and receiving signals in a signal coverage area, and wherein the microcellular system includes at least one second cell having a second transceiver for transmitting and receiving signals and being within the signal coverage area of the first transceiver.

9. The method of claim 1, wherein the macrocellular system includes at least one first cell having a first transceiver for transmitting and receiving signals in a signal coverage area, and wherein the microcellular system includes at least one second cell having a second transceiver for transmitting and receiving signals and being partially within the signal coverage area of the first transceiver.

10. A method for registering a mobile unit with a microcellular system when the mobile unit enters the microcellular system from a macrocellular system adjacent to the microcellular system, comprising the steps of:

providing a macrocellular registration signal from the macrocellular system to the mobile unit before the mobile unit enters the microcellular system;

providing a microcellular registration signal from the microcellular system to the mobile unit when the mobile unit enters the microcellular system; and registering the mobile unit with the microcellular system in response to the microcellular registration signal, wherein the microcellular and macrocellular systems have the same system identification signals.

11. The method of claim 10, wherein the macrocellular system includes at least one main cell having a first transceiver for transmitting and receiving signals in a signal coverage area, and wherein the microcellular system includes at least one border cell and at least one interior cell, the at least one border cell having a second transceiver for transmitting and receiving signals and being substantially within the signal coverage area of the first transceiver, the at least one interior cell having a third transceiver for transmitting and receiving signals and being substantially outside the signal coverage area of the first transceiver.

12. The method of claim 11, wherein the steps of providing the microcellular registration signal includes the steps of:

providing a first registration signal using the second transceiver; and providing a second registration signal using the third transceiver.

13. The method of claim 12, wherein the registering step includes the step of:

registering the mobile unit with the microcellular system responsive to at least the first and second registration signals.

14. The method of claim 10, wherein the macrocellular system includes at least one main cell having a first transceiver for transmitting and receiving signals in a signal coverage area, and wherein the microcellular system includes at least one underlay cell having a second transceiver for transmitting and receiving signals, the at least one underlay cell positioned in the signal coverage area of the first transceiver.

15. The method of claim 10, wherein the macrocellular system includes at least one main cell having a first transceiver for transmitting and receiving signals in a signal coverage area, and wherein the microcellular system includes at least one partial underlay cell having a second transceiver for transmitting and receiving signals, the at least one partial underlay cell positioned partially in the signal coverage area of the first transceiver.

16. A method for notifying a macrocellular system that a mobile unit has traveled into an adjacent microcellular system, comprising the steps of:

registering the mobile unit with the microcellular system when the mobile unit travels into the microcellular system; and registering the mobile unit with a communications interface system after registering the mobile unit with the microcellular system for notifying the macrocellular system that the mobile unit has entered into the microcellular system.

17. The method of claim 16, wherein the communications interface system includes an EIA/TIA IS-41 Cellular Radio Telecommunications Intersystem Operations interface.

18. The method of claim 16, wherein the macrocellular system includes at least one first cell having a first transceiver for transmitting and receiving signals in a signal coverage area, wherein the microcellular system includes at least one second cell and at least one third cell, the at least one second cell having a second transceiver for transmitting and receiving signals and located substantially in the signal coverage area of the first transceiver, the at least one third cell having a third transceiver for transmitting and receiving signals and located substantially outside the signal coverage area of the first transceiver.

19. The method of claim 18, wherein the mobile unit is registered with the communications interface system as a function of a predetermined criteria, the predetermined criteria including a preselected number of registrations of the mobile unit with the at least one second cell.

20. The method of claim 16, wherein the macrocellular system includes at least one first cell having a first transceiver for transmitting and receiving signals in a signal coverage area, and wherein the microcellular system includes at least one second cell and at least one third cell, the at least one second cell having a first transceiver for transmitting and receiving signals and positioned in the signal coverage area of the first transceiver, the at least one second cell having a second transceiver for transmitting and receiving signals and positioned outside the signal coverage area of the first transceiver, the mobile unit being located in one of the at least one second and third cells.

* * * * *